US012561500B2

(12) United States Patent
Kayode

(10) Patent No.: US 12,561,500 B2
(45) Date of Patent: Feb. 24, 2026

(54) HISTORY-MATCHING METHODOLOGY THAT MINIMIZES NON-UNIQUENESS PROBLEM AND ENSURE SMOOTH TRANSITION FROM HISTORY TO PREDICTION

(71) Applicant: Saudi Arabian Oil Company, Dhahran (SA)

(72) Inventor: Babatope Kayode, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 938 days.

(21) Appl. No.: 17/327,021

(22) Filed: May 21, 2021

(65) Prior Publication Data

US 2022/0374571 A1 Nov. 24, 2022

(51) Int. Cl.
| | |
|---|---|
| *G06F 30/28* | (2020.01) |
| *E21B 49/08* | (2006.01) |
| *G06F 111/10* | (2020.01) |
| *G06F 113/08* | (2020.01) |

(52) U.S. Cl.
CPC ............ *G06F 30/28* (2020.01); *E21B 49/087* (2013.01); *E21B 2200/20* (2020.05); *G06F 2111/10* (2020.01); *G06F 2113/08* (2020.01)

(58) Field of Classification Search
CPC ...... G06F 30/28; G06F 30/20; G06F 2111/10; G06F 2113/08; E21B 49/087; E21B 2200/20; E21B 41/00; E21B 49/008; E21B 43/00
See application file for complete search history.

(56) References Cited

U.S. PATENT DOCUMENTS

| | | | |
|---|---|---|---|
| 10,359,542 | B2 | 7/2019 | Kayode et al. |
| 10,867,248 | B1 | 12/2020 | Sun et al. |
| 2009/0070086 | A1 | 3/2009 | Le Ravalec et al. |
| 2009/0119082 | A1 | 5/2009 | Fitzpatrick et al. |

(Continued)

FOREIGN PATENT DOCUMENTS

WO WO 2011100009 8/2011

OTHER PUBLICATIONS

Williams et al. "The Stratigraphic Method: A Structured Approach to History-Matching Complex Simulation Models" 1998 (Year: 1998).*

(Continued)

*Primary Examiner* — Rehana Perveen
*Assistant Examiner* — Troy A Maust
(74) *Attorney, Agent, or Firm* — Fish & Richardson P.C.

(57) ABSTRACT

Systems and methods include a computer-implemented method for predicting values. A numerical simulation model is generated based on observed production rates and flowing pressure and build-up (FPBU) test rates. A simulated diagnostic plot is generated using simulated FPBU data extracted from the numerical simulation model. Simulation model properties of the numerical simulation model are adjusted until the simulated diagnostic plot matches within a tolerance to an observed FPBU diagnostic plot. Predicted values including a static pressure, a water cut, and a gas-oil rate (GOR) are predicted using the simulated FPBU data. Observed data of a reservoir is reviewed and quality-checked based on comparing the predicted values within a tolerance of the observed data.

20 Claims, 33 Drawing Sheets

(56) References Cited

U.S. PATENT DOCUMENTS

| | | | |
|---|---|---|---|
| 2009/0319180 A1 | 12/2009 | Robinson | |
| 2010/0286971 A1 | 11/2010 | Middya et al. | |
| 2011/0040536 A1 | 2/2011 | Levitan | |
| 2013/0073272 A1 | 3/2013 | Wallace et al. | |
| 2014/0349268 A1 | 11/2014 | Tazerout et al. | |
| 2014/0350906 A1 | 11/2014 | Killough et al. | |
| 2021/0018637 A1* | 1/2021 | Amin | G01V 1/282 |
| 2022/0373711 A1* | 11/2022 | Weijers | G01V 20/00 |

OTHER PUBLICATIONS

Siu et al. "Efficient Approach for Well Calibration in Reservoir Simulation After a Successful History Match" 2000 (Year: 2000).*

Rehman et al. "Role of EWT in Declaration of Commerciality & Field Development" 2010 (Year: 2010).*

Teng et al. "Well Testing by Design: Transient Modelling for Predicting Behaviour in Extreme Wells" 2006 (Year: 2006).*

Liu et al. "Continuous Reservoir Simulation Model Updating and Forecasting Using a Markov Chain Monte Carlo Method" 2009 (Year: 2009).*

Shchipanov et al. "Pressure Transient Analysis as an Element of Permanent Reservoir Monitoring" 2014 (Year: 2014).*

Anderson et al. "Formation pressure testing at the Mount Elbert Gas Hydrate Stratigraphic Test Well, Alaska North Slope: Operational summary, history matching, and interpretations" 2011 (Year: 2011).*

A. Z. Noah. Use repeat formation tester for determination of some reservoir characteristics for kareem formation in some wells at Amal Field, Gulf of Suez Area, Egypt. American Journal of Research Communication (Year: 2014).*

PetroWiki "Diagnostic plots" retrieved from the Internet Archive Wayback Machine on Aug. 5, 2024 after being archived on Jan. 21, 2021, https://web.archive.org/web/20210126183043/https://petrowiki.spe.org/Diagnostic_plots (Year: 2021).*

PetroWiki "Pressure transient testing" retrieved from the Internet Archive Wayback Machine on Aug. 5, 2024 after being archived on Jan. 21, 2021, https://web.archive.org/web/20210121015948/https://petrowiki.spe.org/Pressure_transient_testing (Year: 2021).*

Ariadji et.al., "Reservoir Characterization Through Single-Well Numerical Simulation Study Using DST Matching for a Gas-Condensate Reservoir," SPE-93218, presented at the Asia Pacific Oil & Gas Conference and Exhibition, Apr. 2005, 17 pages.

Chen et al., "A New Algorithm for Automatic History Matching," SPE 4545, Society of Petroleum Engineers Journal, Dec. 1974, 14(6), 16 pages.

Clarkson et al., "Relative permeability of CBM reservoirs: Controls on curve shape," International Journal of Coal Geology, Dec. 2011, 88(4):204-217.

Farzeen et.al, "History to forecast transition challenges in reservoir simulation of giant oilfields," SPE 186051, presented at the SPE Reservoir Characterization Conference and Exhibition, Abu Dhabi, UAE, May 2017, 16 pages.

Greaser et al., "Use of Fine Gridding in Full Field Simulation," SPE 29854, presented at the SPE Middle East Oil Show, Bahrain, Mar. 1995, 11 pages.

Horne, "Listening to the Reservoir—Interpreting Data from Permanent Downhole Gauges," (Slide Presentation), SPE Distinguished Lecturer Program 2009-2010; 17 pages.

Jackson et al., "An Integrated Approach to Interval Pressure Transient Test Analysis Using Analytical and Numerical Methods," SPE 81515, SPE International, Middle East Oil Show, Jun. 9-12, 2003, Bahrain; 9 pages.

Kabir et al., "Experiences With Automated History Matching," SPE 79670, SPE Reservoir Simulation Symposium, Feb. 3-5, 2003, Houston, TX; 13 pages.

Kayode et al., "Pressure conditioned modeling: application of time lapse shut in pressure data to map connected reservoir regions for conditions of 3D geomodel property distributions," SPE-192204, presented at the SPE Kingdom of Saudi Arabia Annual Technical Symposium and Exhibition, Dammam, Saudi Arabia, Apr. 2018, 15 pages.

Kayode et.al, "Advances in Transient Modelling: Conducting High Resolution Transient Modelling on Full-Field Coarse Simulation Models," SPE-187992-MS, presented at the SPE Kingdom of Saudi Arabia Annual Technical Symposium and Exhibition, Dammam, Saudi Arabia, Apr. 2017, 11 pages.

Kayode et.al., "Advances in Reservoir Modelling: A New Approach for building Robust Reservoir Models," SPE-187993, presented at the SPE Kingdom of Saudi Arabia Annual Technical Symposium and Exhibition, Dammam, Saudi Arabia, Apr. 2017, 19 pages.

Landa et al., "A Procedure to Integrate Well Test Data, Reservoir Performance History and 4-D Seismic Information into a Reservoir Description," SPE 38653, SPE Annual Technical Conference and Exhibition, Oct. 5-8, 1997, San Antonio, TX, 16 pages.

Little et al., "History Matching with Production Uncertainty Eases Transition into Prediction," SPE-100206, presented at the SPE Europec/EAGE Annual Conference and Exhibition, Vienna Austria, Jun. 12-15, 2006, 7 pages.

Liu et al., "A Practical Approach to History-matching Large, Multi-well SAGD Simulation Models: A Mackay River Case Study," SPE 165555, SPE Heavy Oil Conference Canada, Jun. 11-13, 2013, Calgary, Alberta, Canada, 11 pages.

Ludvigsen et al., "DST Matching and Interpretation through Numerical Well Testing on the Johan Sverdrup Field," SPE-175088-MS, presented at the SPE Annual Technical Conference and Exhibition, Houston, Texas, Sep. 2015, 38 pages.

Masumoto, "Pressure Derivative Matching Method for Two Phase Fluid Flow in Heterogeneous Reservoir," SPE 59462, SPE Asia Pacific Conference on Integrated Modelling for Asset Management, Apr. 25-26, 2000, Yokohama, Japan, 8 pages.

Mohmed et al., "History to Forecast Transition Challenges in Reservoir Simulation of Giant Oilfields," SPE-186051-MS, presented at the SPE Reservoir Characterization and Simulation Conference and Exhibition, Abu Dhabi, UAE, May 2017, 16 pages.

O'Sullivan et al., "State of the art geothermal reservoir simulation," Geothermics, Aug. 2001, 30(4):395-429.

Sarac et al., "Integrated History Matching on Interference Well Test Data in a Naturally Fractured Reservoir with Automated Adjoint Gradient Based Inversion Technique," SPE 181498, SPE International, SPE Annual Technical Conference and Exhibition, Sep. 26-28, 2016, Dubai, UAE, 19 pages.

Siu et al., "Efficient Approach for Well Calibration in Reservoir Simulation After a Successful History Match," SPE-59718, presented at the SPE Permian Basin Oil and Gas Recovery Conference, Midland, Texas, Mar. 2000, 4 pages.

Teng et al., "Well Test by Design: Transient Modelling to Predict Behavior in Extreme Wells," SPE 101872, SPE Asia Pacific Oil & Gas Conference and Exhibition, Sep. 11-13, 2006, Adelaide, Australia, 14 pages.

Tovar et al., "Improved Reservoir Description from Pressure Transients," SPE 170719, SPE Annual Technical Conference and Exhibition, Oct. 27-29, 2014, Amsterdam, Netherlands, 12 pages.

Verga et al., "An Effective Criterion to Prevent Injection Test Numerical Simulation from Spurious Oscillations," Oil and Gas Science and Technology, Jan. 2014; 69(4):633-651.

Welty et al., "Automated History Matching Of Well Tests," SPE 7695, SPE Reservoir Simulation Symposium, Jan. 31-Feb. 2, 1979, Denver, CO, 10 pages.

Zheng et al., "Geological Model Evaluation through Well Test Simulation: A Case Study from the Wytch Farm Oilfield, Southern England, " Journal of Petroleum Geology, Jan. 2007, 30(1):41-58.

Ehlig-Economides, "Use of the Pressure Derivative for Diagnosing Pressure-Transient Behavior," Journal of Petroleum Technology, Oct. 1988, 40(10):1280-1282, 3 pages.

SAIP Examination Report in Saudi Arabian Appln No. 122431074, dated Jan. 3, 2024, 15 pages (with English translation).

* cited by examiner

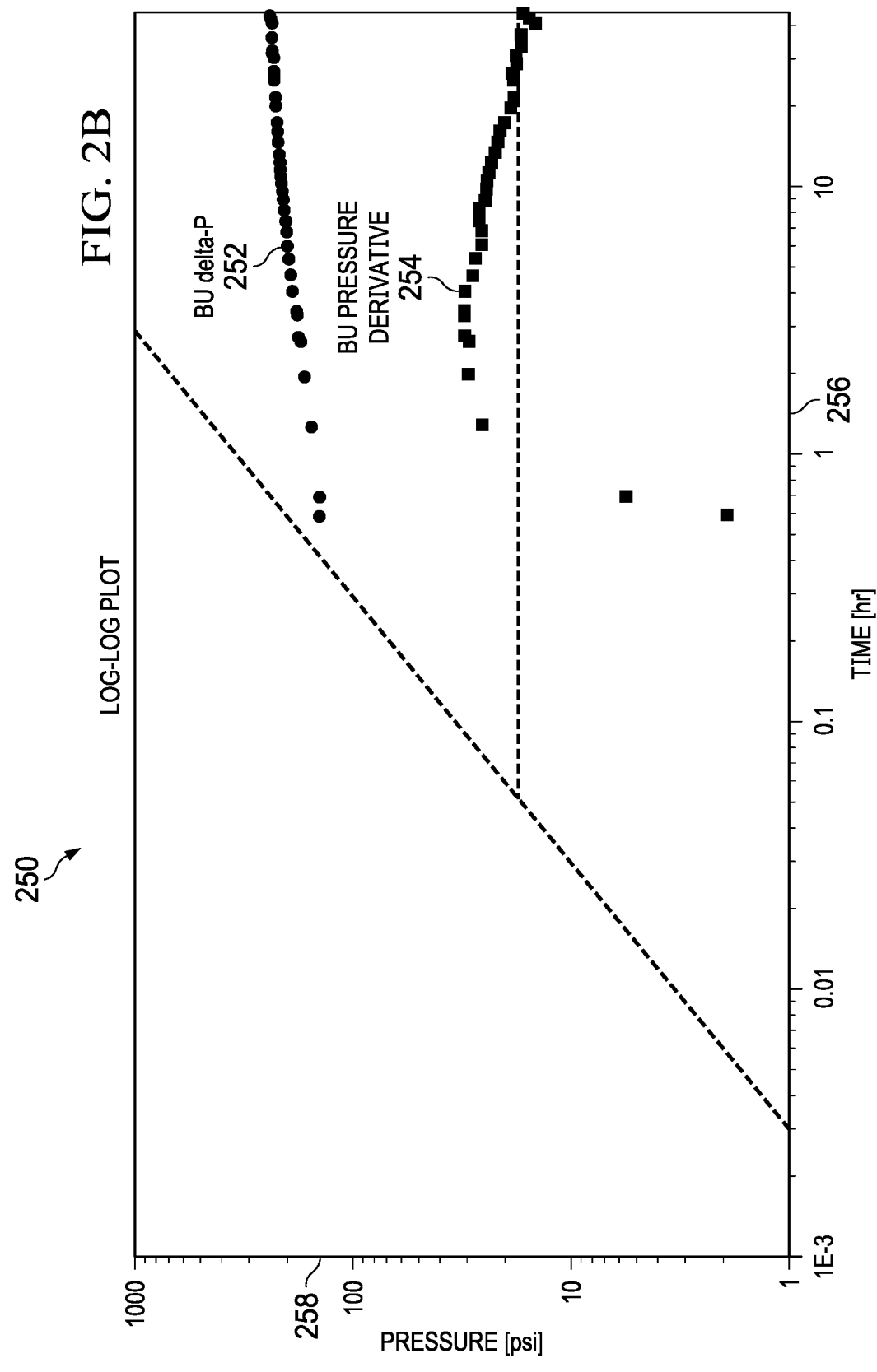

500

550

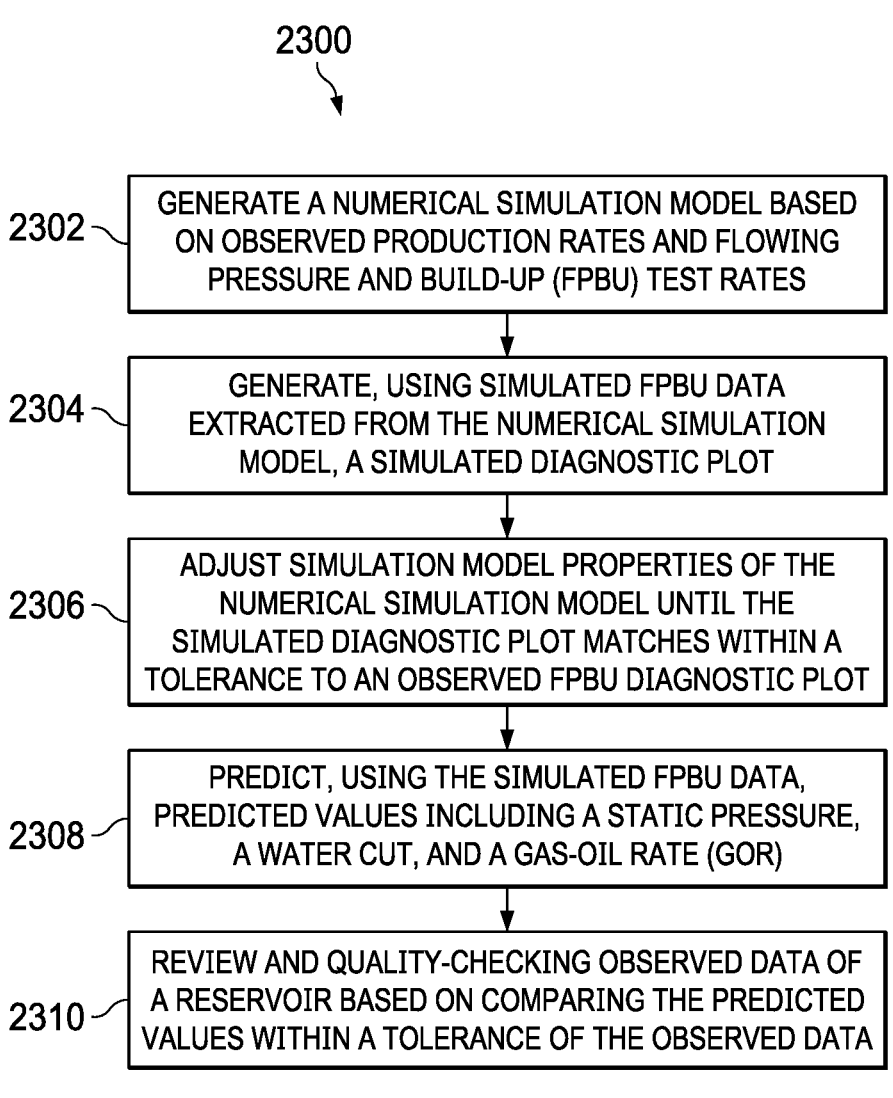

2300

2302 — GENERATE A NUMERICAL SIMULATION MODEL BASED ON OBSERVED PRODUCTION RATES AND FLOWING PRESSURE AND BUILD-UP (FPBU) TEST RATES

2304 — GENERATE, USING SIMULATED FPBU DATA EXTRACTED FROM THE NUMERICAL SIMULATION MODEL, A SIMULATED DIAGNOSTIC PLOT

2306 — ADJUST SIMULATION MODEL PROPERTIES OF THE NUMERICAL SIMULATION MODEL UNTIL THE SIMULATED DIAGNOSTIC PLOT MATCHES WITHIN A TOLERANCE TO AN OBSERVED FPBU DIAGNOSTIC PLOT

2308 — PREDICT, USING THE SIMULATED FPBU DATA, PREDICTED VALUES INCLUDING A STATIC PRESSURE, A WATER CUT, AND A GAS-OIL RATE (GOR)

2310 — REVIEW AND QUALITY-CHECKING OBSERVED DATA OF A RESERVOIR BASED ON COMPARING THE PREDICTED VALUES WITHIN A TOLERANCE OF THE OBSERVED DATA

FIG. 23

HISTORY-MATCHING METHODOLOGY THAT MINIMIZES NON-UNIQUENESS PROBLEM AND ENSURE SMOOTH TRANSITION FROM HISTORY TO PREDICTION

TECHNICAL FIELD

The present disclosure applies to history-matching of reservoir permeability.

BACKGROUND

Permeability calibration using pressure transient derivatives is typically performed for single well models. As a result, while permeability can be calibrated, a current reservoir pressure cannot be calibrated on such models since the field-wide depletion and possible injection history from other wells is not usually incorporated into such single-well models. In addition, the use of pressure transient derivative for single-well models' calibration cannot be used to calibrate current well productivity index (PI). This is because the observed delta-P on a well is a sum of delta-P due to the well's own rate history and additional delta-P due to the superposition effect of surrounding wells in the same reservoir. Since these other wells are not usually included in the single well calibration model, the simulated delta-P may be different from the actual delta-P, resulting in an incorrect calculation of PI. When history-matching is used and is driven by single-point static pressure data, it is typically necessary to conduct a PI calibration at the end of history-match. This process can be time-consuming, which further can downgrade confidence in the quality of the model and can reduce the predictive capability of the model, especially with respect to infill wells. Performance of new wells in the model may not be consistent with reality because the model has been history-matched with property sets that are different from the truth.

SUMMARY

The present disclosure describes techniques that can be used to determine reservoir permeability by history matching flowing pressure and build-up (FPBU) data.

In some implementations, a computer-implemented method includes the following. A numerical simulation model is generated based on observed production rates and FPBU test rates. A simulated diagnostic plot is generated using simulated FPBU data extracted from the numerical simulation model. Simulation model properties of the numerical simulation model are adjusted until the simulated diagnostic plot matches within a tolerance to an observed FPBU diagnostic plot. Predicted values including a static pressure, a water cut, and a gas-oil rate (GOR) are predicted using the simulated FPBU data. Observed data of a reservoir is reviewed and quality-checked based on comparing the predicted values within a tolerance of the observed data.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. The quality of a history-matched model can be improved by minimizing the impact of non-uniqueness and ensuring that the history-matched model is a better representation of a reservoir. History-matching that is FPBU-driven can be used to reduce or eliminate the non-uniqueness problem without requiring a time-consuming practice of productivity index (PI) calibration, since permeability and PI can be independently calibrated. For example, using the techniques of the present disclosure, permeability can be calibrated from derivative stabilization, and the PI can be calibrated based on a separation between a delta-P plot and the stabilization of the derivative plot. An FPBU plot can help to calibrate an aquifer strength. History-matched model properties can be close to unknown properties of the actual reservoir, eliminating the need to complete well PI calibration at the end of history-matching. In addition, this history-matching approach can facilitate the identification of incorrect single-point static pressures and identify missing well events such as inaccurate or missing production data. Performing individual calibration of parameters used in history-matching can ensure that non-uniqueness is reduced. This history-matching approach can help to identify incorrect single-point static pressures and identify missing well events such as inaccurate or missing production data. Traditionally, history matching is an inverse problem in which model permeability is updated until model response matches with observed pressure. This traditional approach is a time-consuming trial-and-error process. The presently disclosed approach is much faster as it determines model permeability directly from observed FPBU.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIGS. 2A and 2B are plots collectively showing an example of a build-up pressure methodology, according to some implementations of the present disclosure.

FIG. 23 is a flowchart of an example of a method for predicting values of static pressure, water cut, and gas-oil rate (GOR) using simulated FPBU data, according to some implementations of the present disclosure.

Like reference numbers and designations in the various drawings indicate like elements.

DETAILED DESCRIPTION

The following detailed description describes techniques for conducting history matching using measured flowing pressure and build-up (FPBU) as the objective function rather than the traditional use of datum pressure. The history matched model can then be used for reliable forecast of static pressure, water cut, and gas-oil rate (GOR). Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Techniques of the present disclosure can be used to improve the quality of a history-matched model by minimizing the impact of non-uniqueness and ensuring that the history-matched model is a better representation of a reservoir. As a result of the non-uniqueness problem that is common to typical history-matching, it is sometimes necessary to carry out productivity index (PI) calibration after history-matching, which can be a cumbersome process. The techniques of the present disclosure can be used in history-matching based on both flowing pressure (FP)+build-up (BU) derivative using a full-field simulation model. The derivative portion helps to properly calibrate permeability and PI, while the FP portion helps to properly calibrate the aquifer strength, bottom-hole flowing pressure and wellbore skin. The individual determination of the various parameters helps to eliminate the need for trial-and-error and to eliminate/reduce the non-uniqueness problem.

The techniques of the present disclosure can also help to detect incorrect single-point pressure data and missing well event data. Once the FPBU data has been matched, the model can predict any future single-point pressure data if and only if: 1) all relevant well events such as depletion and injection are captured in the model, and 2) the observed pressure record is correct. If history-matching is conducted based on the techniques of the present disclosure, there is no need for PI calibration at the end of history-matching, thereby saving time and improving confidence in the quality of the resulting history-matched model.

Figure 12:
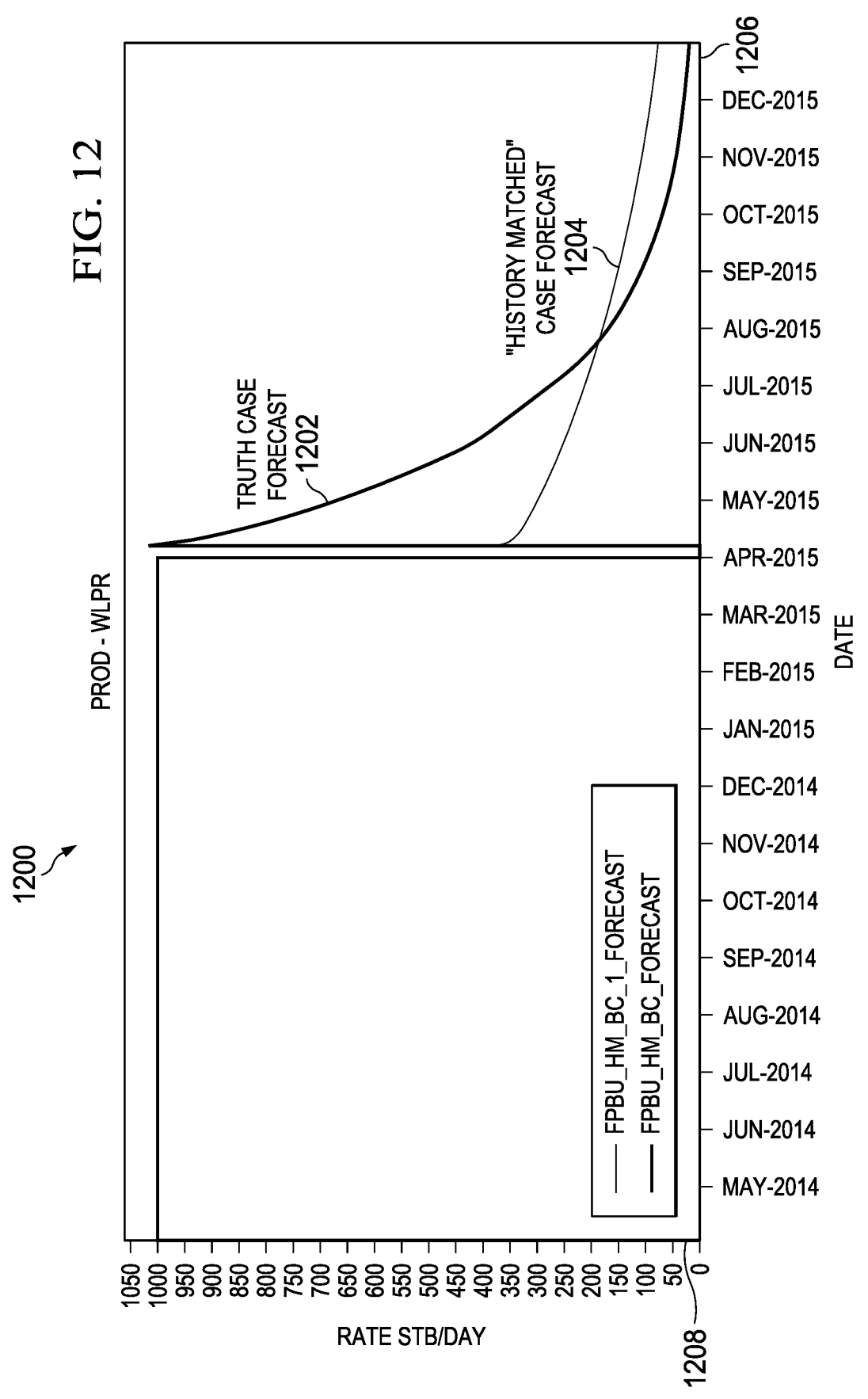
FIG. 12 is an illustration showing an example of a prediction comparison between truth case and a history-matched case, according to some implementations of the present disclosure.
Figure 18:
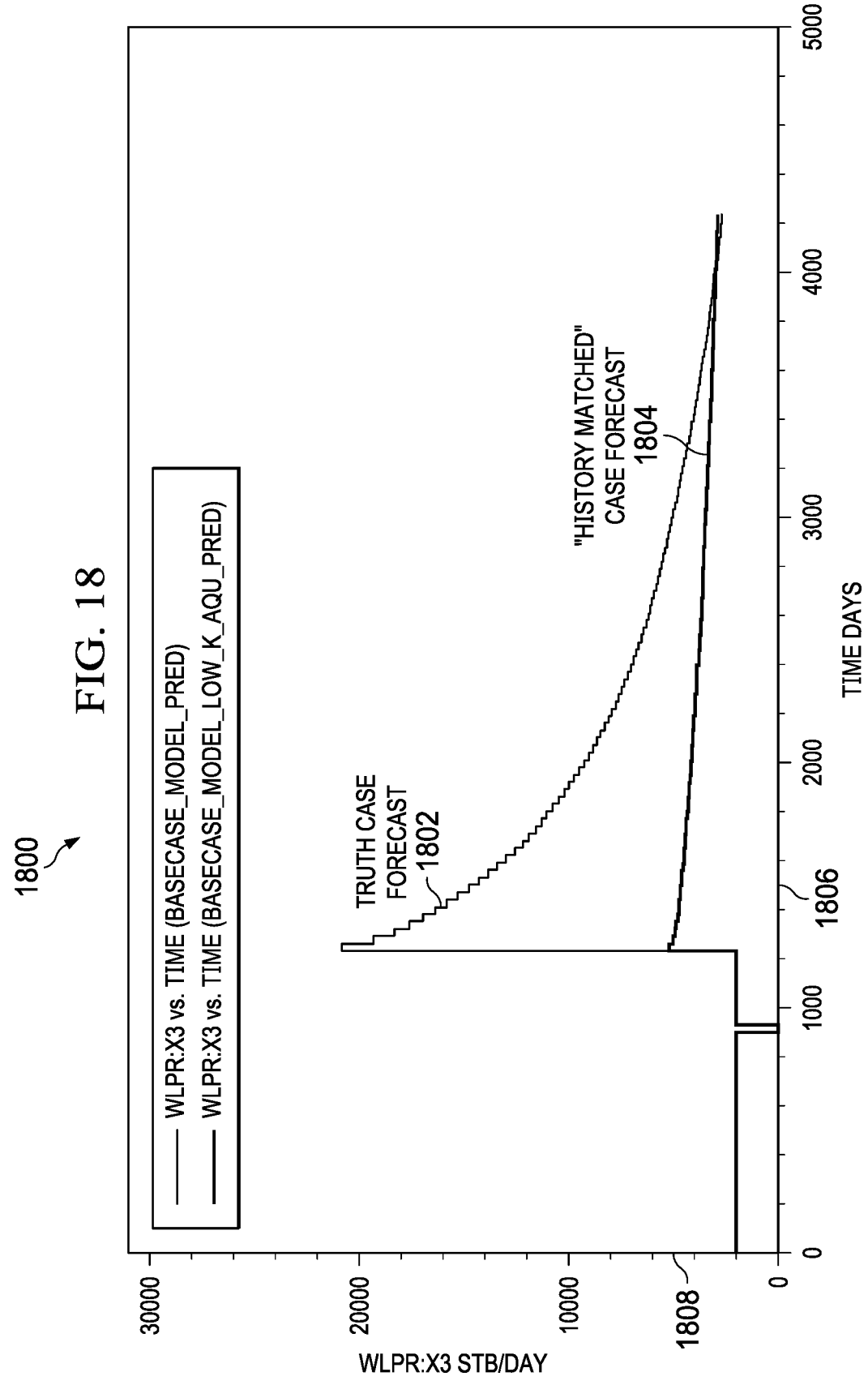
FIG. 18 is an illustration showing an example of forecast profiles for an original synthetic model and a history-matched geo-model, according to some implementations of the present disclosure.

As shown in FIG. 12 and FIG. 18, when a history-match suffers from non-uniqueness problem such that the properties of the history-matched model are not similar to the properties of the truth model, then during forecast, the productivity of a history-matched model may not be similar to that of the truth model. Practitioners of history-matching typically use PI calibration to increase the productivity of the well post history-matching.

Figure 22:
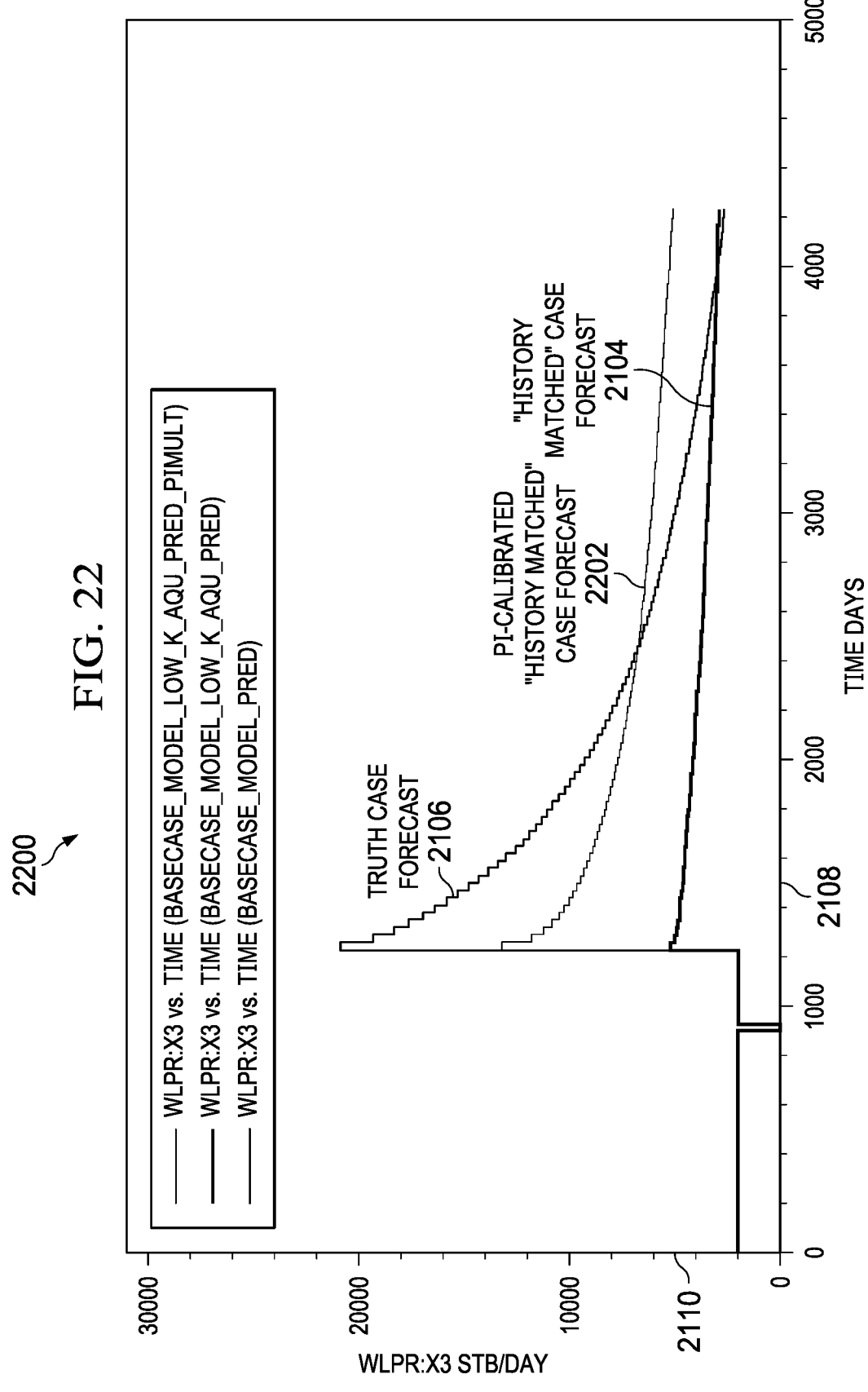
FIG. 22 is an illustration showing an example of an impact of a well PI calibration, according to some implementations of the present disclosure.

A PI multiplier can be applied on the static-pressure driven history-matching on a trial-and-error basis until a satisfactory match of PI is achieved. FIG. 22 shows a prediction result after an application of the PI multiplier=10 on the history-matched model shown in FIG. 18.

The challenge of the PI multiplier is that, even if the start-up PI is matched at the beginning of the forecast, the long-term performance profile of the well is not necessarily similar to the truth case model. This is evident in the decline rates of the plots in FIG. 22. Other challenges and limitations of the practice of PI calibration can include: (a) being a time-consuming process, (b) downgrading confidence in the quality of the history-matched model, and (c) reducing the predictive capability of the model, especially with regards to infill or new wells production forecasting.

History-matching is the process of tuning the properties of a geo-model until its dynamic results mimic observed data. Observed data that is history-matched includes generally static pressure data and, if available, production ratios such as water-cut and GOR, modular dynamic testing (MDT), mobility, and pulsed-neutron well logging (PNL). A first stage of history-matching can include a static pressure match. Where there is no multiphase flow, and where other less readily available reservoir characterization data are unavailable, a static pressure match may be the only match conducted.

Geo-model properties that are tuned can include, for example, permeability, reservoir connectivity pattern (facies map), and aquifer strength. Well parameters that are tuned during history-matching can include the PI.

Non-uniqueness can arise from the fact that several combinations of parameters can result in an equiprobable history-matched model, each of which potentially resulting in different prediction (forecast) profiles. It is generally recognized that any single deterministic history-match can produce significant non-uniqueness resulting from multiple potential degrees-of-freedom for history-matching. Techniques of the present disclosure include a new methodology to conduct history-matching that can minimize the occurrence of non-uniqueness in history-matching, resulting in a reduction of the associated forecast uncertainties.

Figure 21:
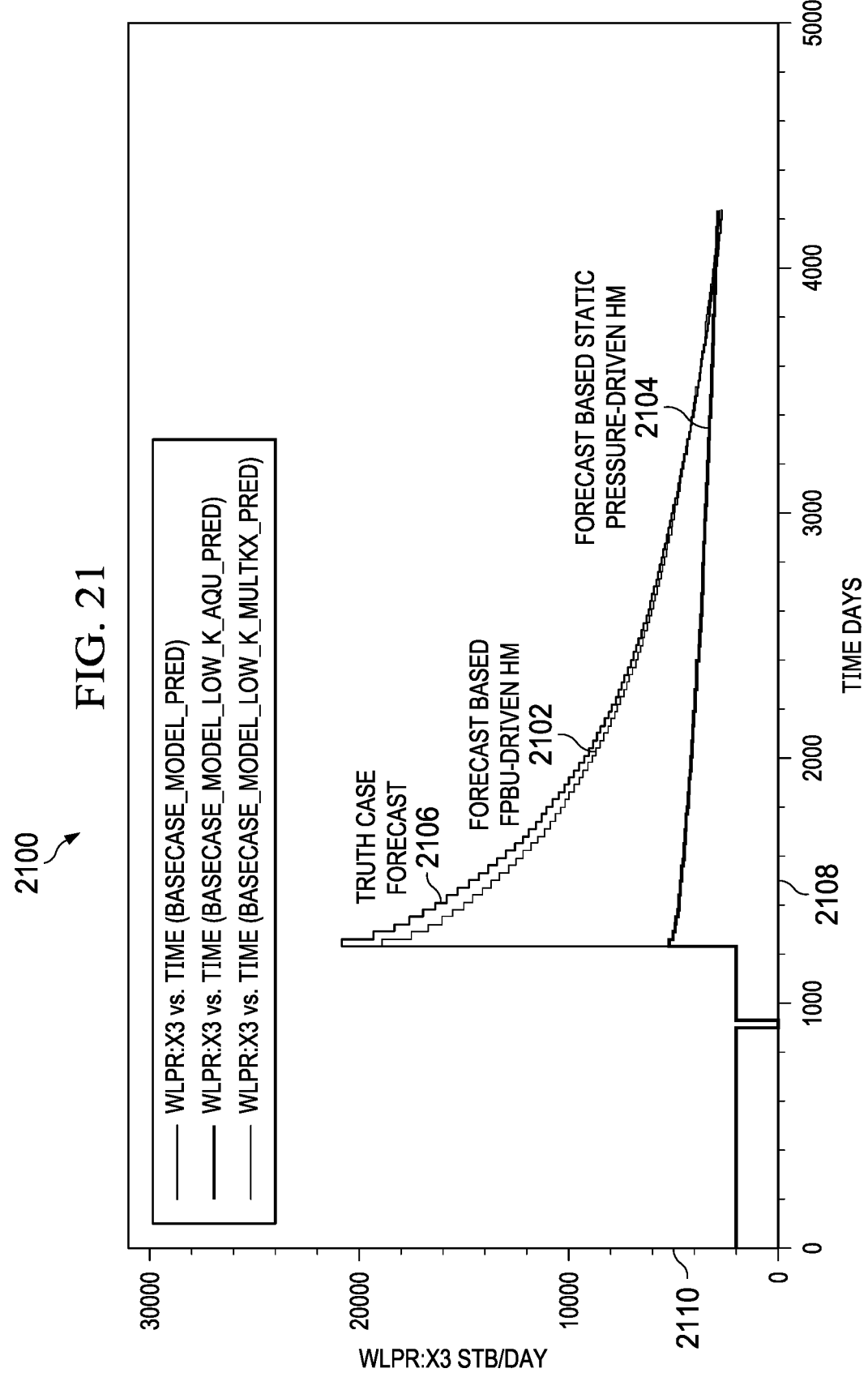
FIG. 21 is an illustration showing an example of forecast profiles for truth case forecast plot and history-matched case plot driven by static pressure and FPBU, according to some implementations of the present disclosure.

History-matching is typically performed using oil rate constraints, while prediction is performed using pressure constraints. This difference in the use of constraints from oil-rate to pressure at the start of prediction causes a discontinuity in well performance which is traditionally corrected using PI calibration. A delay can occur when moving from a well-rate-controlled history-match mode to a well-pressure-controlled prediction. Wells exhibiting too great potential-well PI's are typically adjusted to correct this problem. When history-matching is conducted according to techniques of the present disclosure, the discontinuity at the history-forecast junction can be minimized, eliminating the need for well PI calibration as shown in FIG. 21

Definition of Terms

Flowing pressure and build-up (FPBU) is a pressure transient survey in which a measuring gauge is lowered into a well while it is flowing. Once the gauge reaches the perforations, bottom-hole flowing pressure is measured for some time, the well is shut-in, and then the shut-in pressure is measured.

Observed single-point static pressure is defined as the last-measured data point of an FPBU before the gauge is disengaged and retrieved, or at times a gauge is lowered into an already shut-in well to measure only the shut-in pressure. The single-point static pressure is likewise the final measured data before the gauge is retrieved.

Connected reservoir regions (CRRsP) refers to spatial regions of a reservoir that are in instantaneous pressure communication. Such instantaneous communication is an indication of comparable levels of permeability.

Figure 1A:
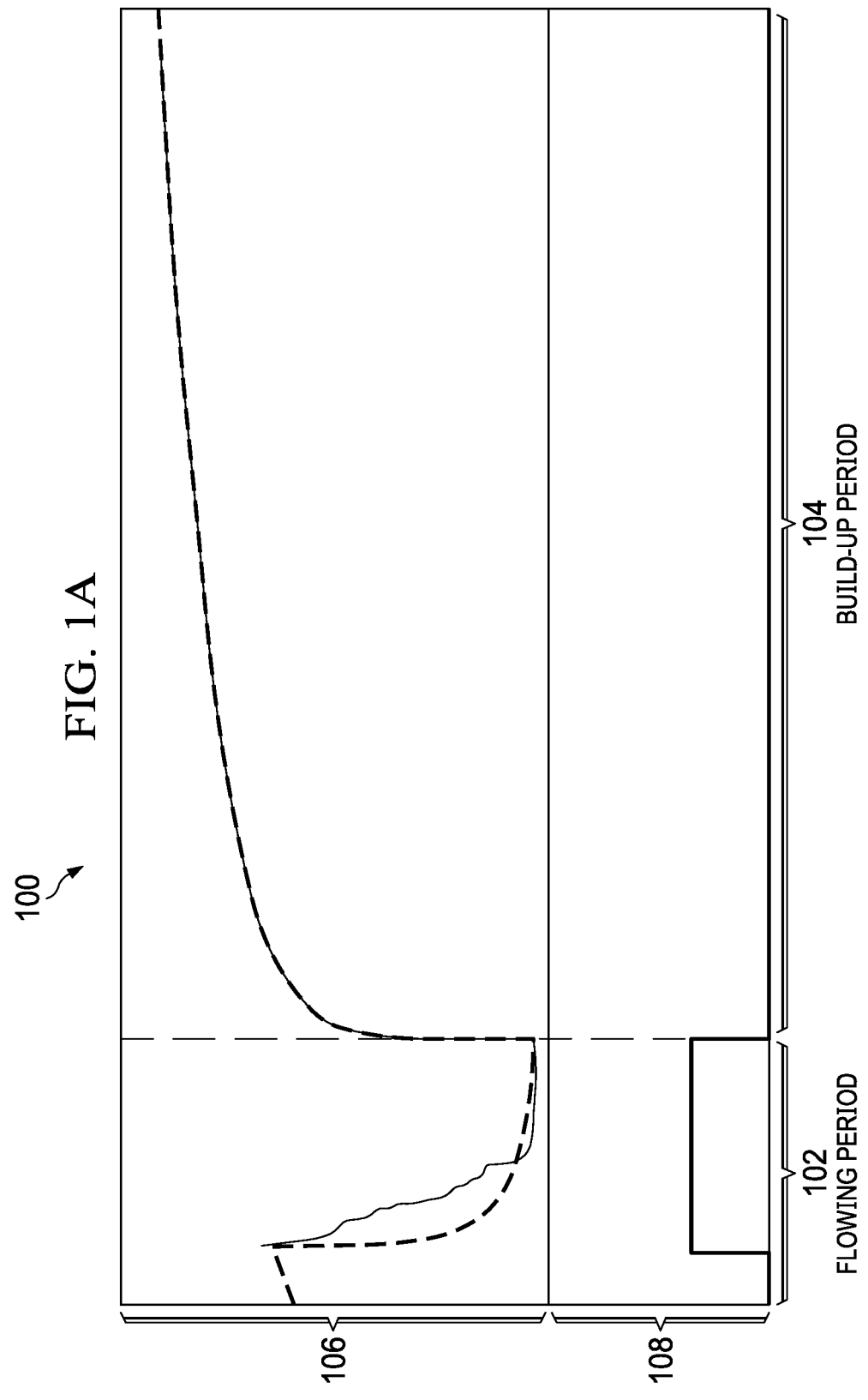
FIG. 1A is an illustration showing an example of a graph of flowing pressure and build-up (FPBU) pressure transient data, according to some implementations of the present disclosure.

FIG. 1A is an illustration showing an example of a graph 100 of FPBU pressure transient data, according to some implementations of the present disclosure. The graph 100 includes a flowing period 102 and a build-up period 104, relative to time. The graph 100 is graphed relative to a pressure 106 and a flowrate 108.

Figure 2A:
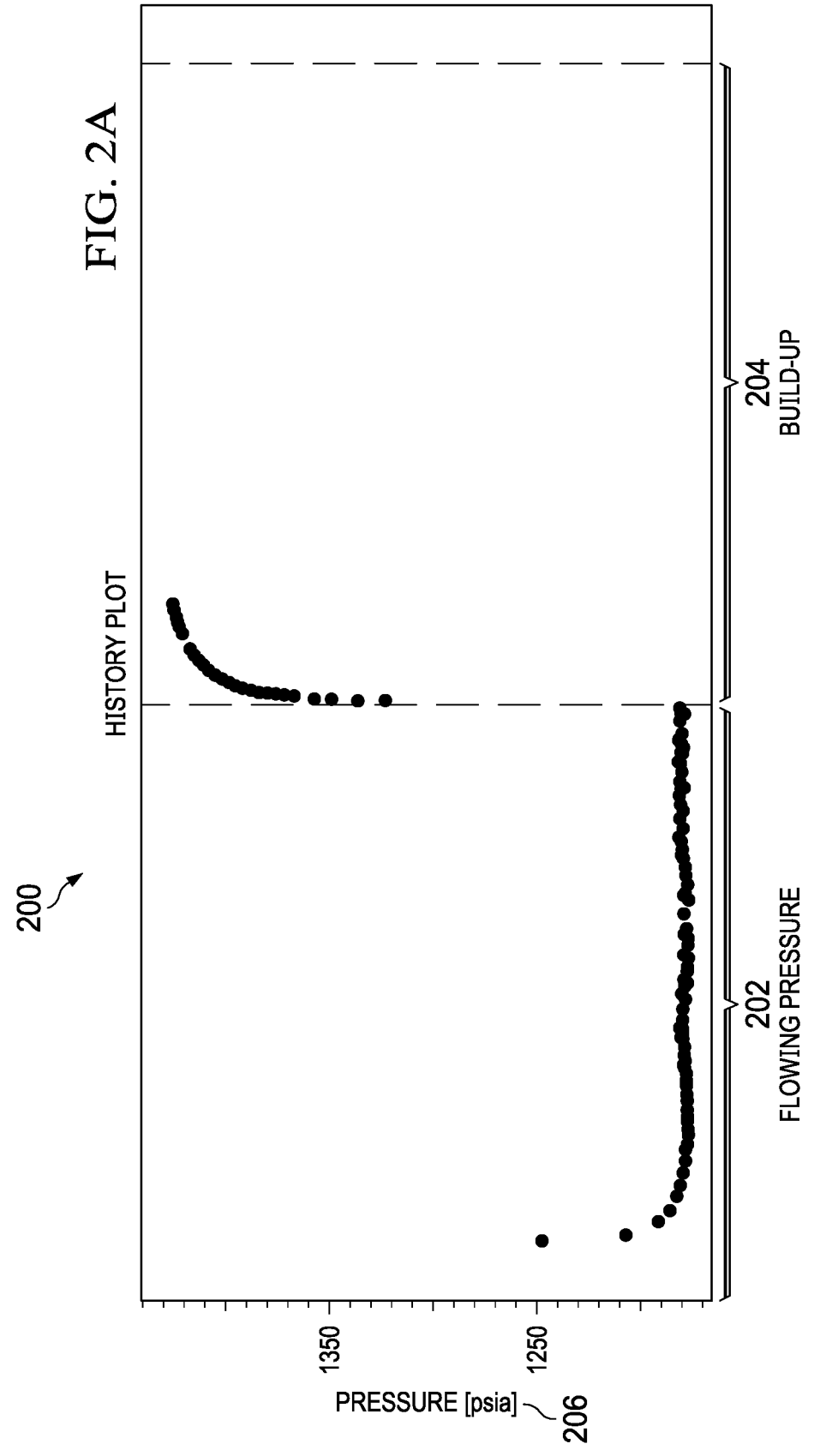

The motivation for the techniques of the present disclosure is to conduct history-matching in a way that eliminates/reduces the non-uniqueness problem. An example of the methodology is illustrated in FIG. 1A and includes using FPBU data for history-matching instead of the conventional approach of using single-point static pressure data. FPBU stands for flowing pressure and build up. This is acquired through well testing and an example is illustrated in FIGS. 2A-2B. Using this methodology, it is required to history-match (HM) the build-up (BU) derivative, the BU delta-Pressure (dP), as well as the flowing pressure (FP) plot.

Figure 1B:
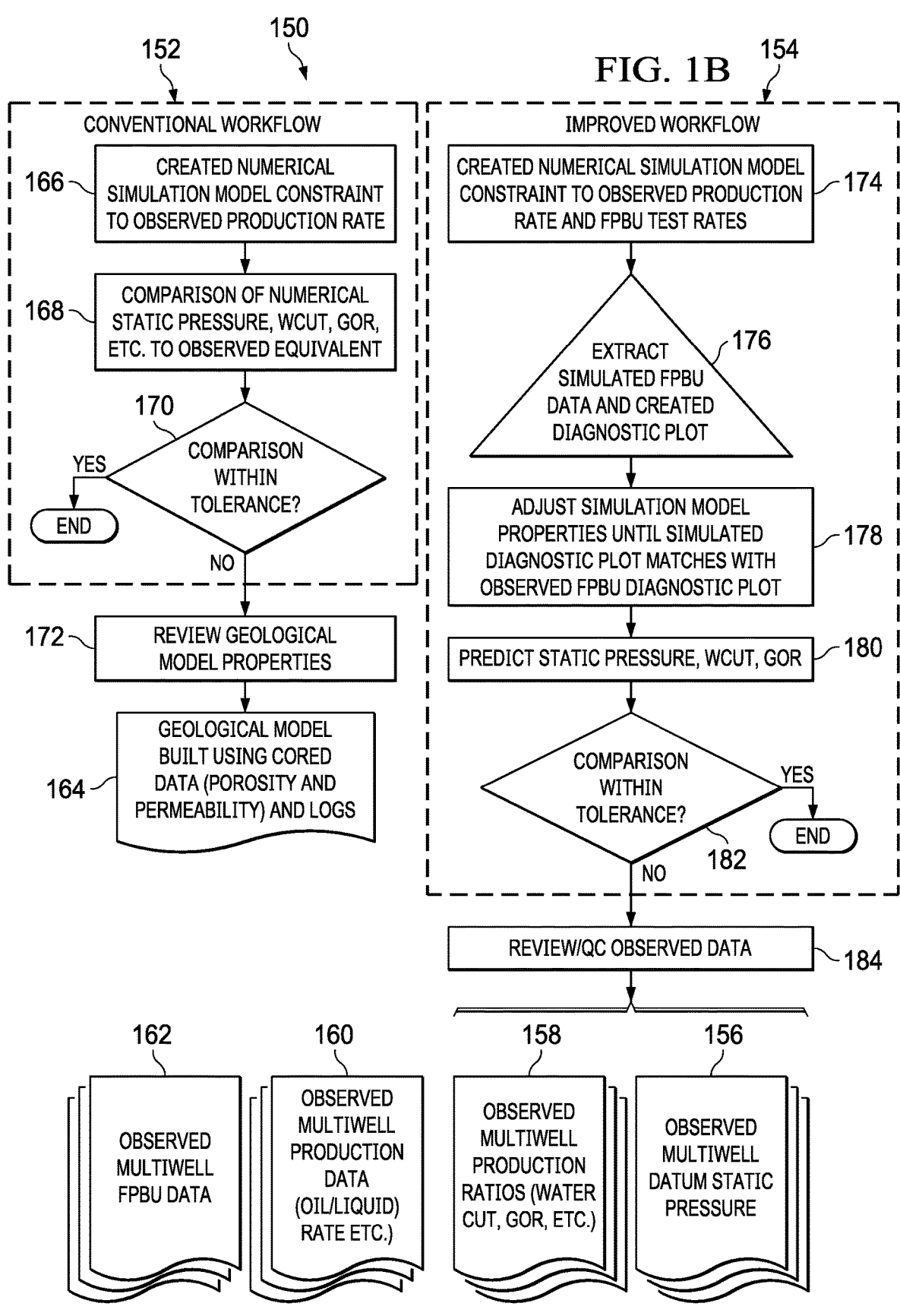
FIG. 1B is a block diagram showing examples of differences in a conventional workflow versus an improved workflow, according to some implementations of the present disclosure.

FIG. 1B is a block diagram 150 showing examples of differences in a conventional workflow 152 versus an improved workflow 154, according to some implementations of the present disclosure. Inputs to the workflows includes an observed multi-well datum static pressure 156, observed multi-well production ratios 158 (including at least water cut and gas oil rate (GOR)), observed multi-well production data 160 (including at least oil and liquid rates), and observed multi-well FPBU data 162. A geological model 164 can be built using cored data (including porosity and permeability data) and logs, and the model is used in both workflows 152 and 154.

In the conventional workflow 152, a numerical simulation 166 model is created that is constrained to an observed production rate. A comparison 168 is made of numerical static pressure, water cut, and a GOR to an observed equivalent. The results of the comparison are compared 170 within a tolerance. If the comparison is not within the tolerance, then geological model properties (such as permeability, aquifer strength, spatial connectivity) are reviewed 172, and the conventional workflow 152 is updated.

In the improved workflow 154, a numerical simulation model is created 174 that is constrained to an observed production rate and FPBU test rates. At 176, simulated FPBU data is extracted and a diagnostic plot is created. At 178, simulation model properties are adjusted until a simulated diagnostic plot matches with an observed FPBU diagnostic plot. At 180, static pressure, water cut, and the GOR are predicted. A comparison 182 is made to see if the predicted values are within a tolerance. If not, at 184, the observed data is reviewed and quality-checked.

FIGS. 2A and 2B are plots collectively showing an example of a build-up pressure methodology, according to some implementations of the present disclosure. FIG. 2A shows a history plot 200 that includes a flowing pressure 202 and a build-up 204 plotted relative to a pressure 206 (for example, in pounds per square inch, absolute (psia)). FIG. 2B shows a log-log plot 250 with a BU delta-P 252 and a BU pressure derivative 254 that are plotted relative to log axes including a time 256 (for example, in hours (hr)) and a pressure 258 (for example, in pounds per square inch (psi)).

After history-matching is performed, the permeability multipliers required at each FPBU well location are then used to calibrate the properties of the non-well grid-blocks within each connected reservoir regions (CRR). This step would ensure that not only is the well itself calibrated (and will thus have a smooth transition from history to forecast without need for well PI calibration), but also the inter-well areas within each CRR would also be calibrated and would ensure the reliability of infill well prediction results.

The Non-Uniqueness Problem

The non-uniqueness problem derives from the practice of using observed single-point static pressure as the key criteria for history-matching as explained with the following example.

Figure 3:
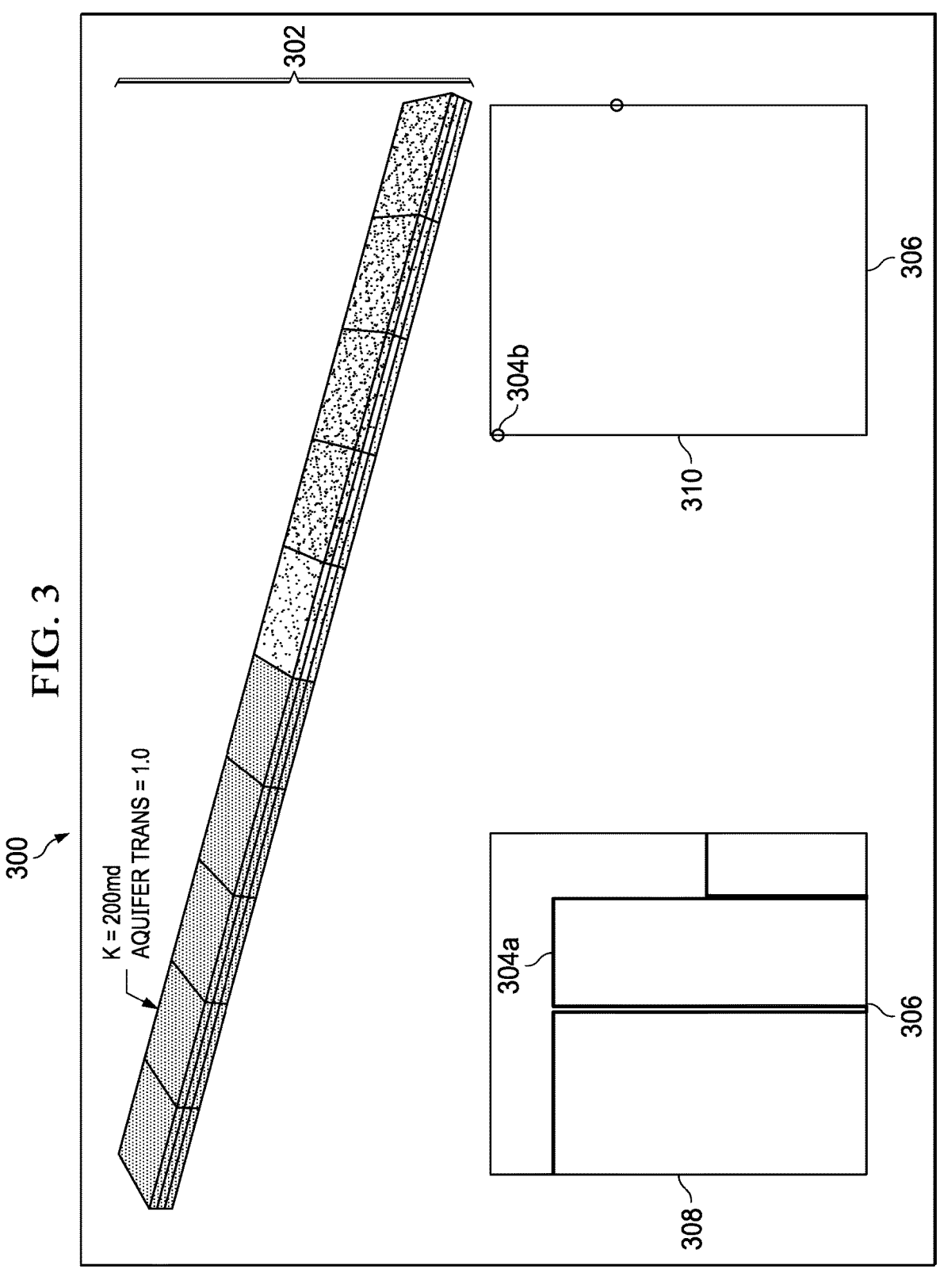
FIG. 3 is an illustration showing an example of a hypothetical model and observed single-point static pressures, according to some implementations of the present disclosure.

FIG. 3 is an illustration 300 showing an example of a hypothetical model 302 and observed single-point static pressures 304*a* and 304*b*, according to some implementations of the present disclosure. The illustration 300 shows a hypothetical model where the reservoir has a permeability of 200 mD (millidarcies) and aquifer transmissibility of 1. The production profile and observed single-point static pressures recorded on a well in the reservoir are as shown in FIG. 3. The information in the illustration 300 is plotted relative to dates 306, pressures 308, and a bottom hole pressure (BHP) 310. During geo-modelling of this reservoir, if the model permeability is not properly captured, and is given as 100 md, by using an oil rate constraint for history-matching, the model is able to produce the required rate, although it is not able to match its observed static pressures.

Figure 4:
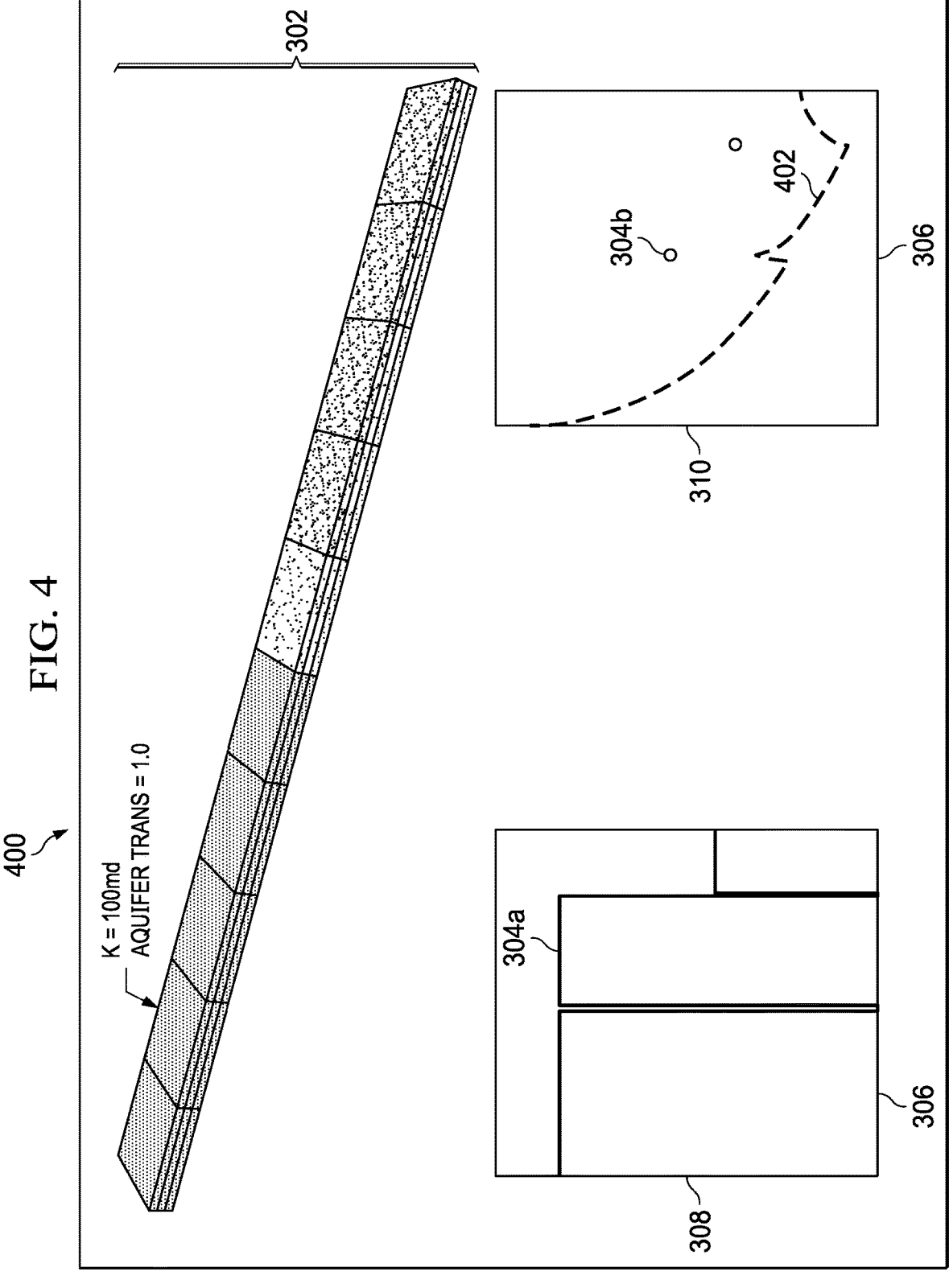
FIG. 4 is an illustration showing an example of geo-model realization of truth case having pessimistic permeability and non-matching pressure, according to some implementations of the present disclosure.

FIG. 4 is an illustration 400 showing an example of geo-model realization of truth case 402 having pessimistic permeability and non-matching pressure, according to some implementations of the present disclosure. In this example, in order to match the observed static pressure, aquifer transmissivity and volume are increased.

Figure 5A:
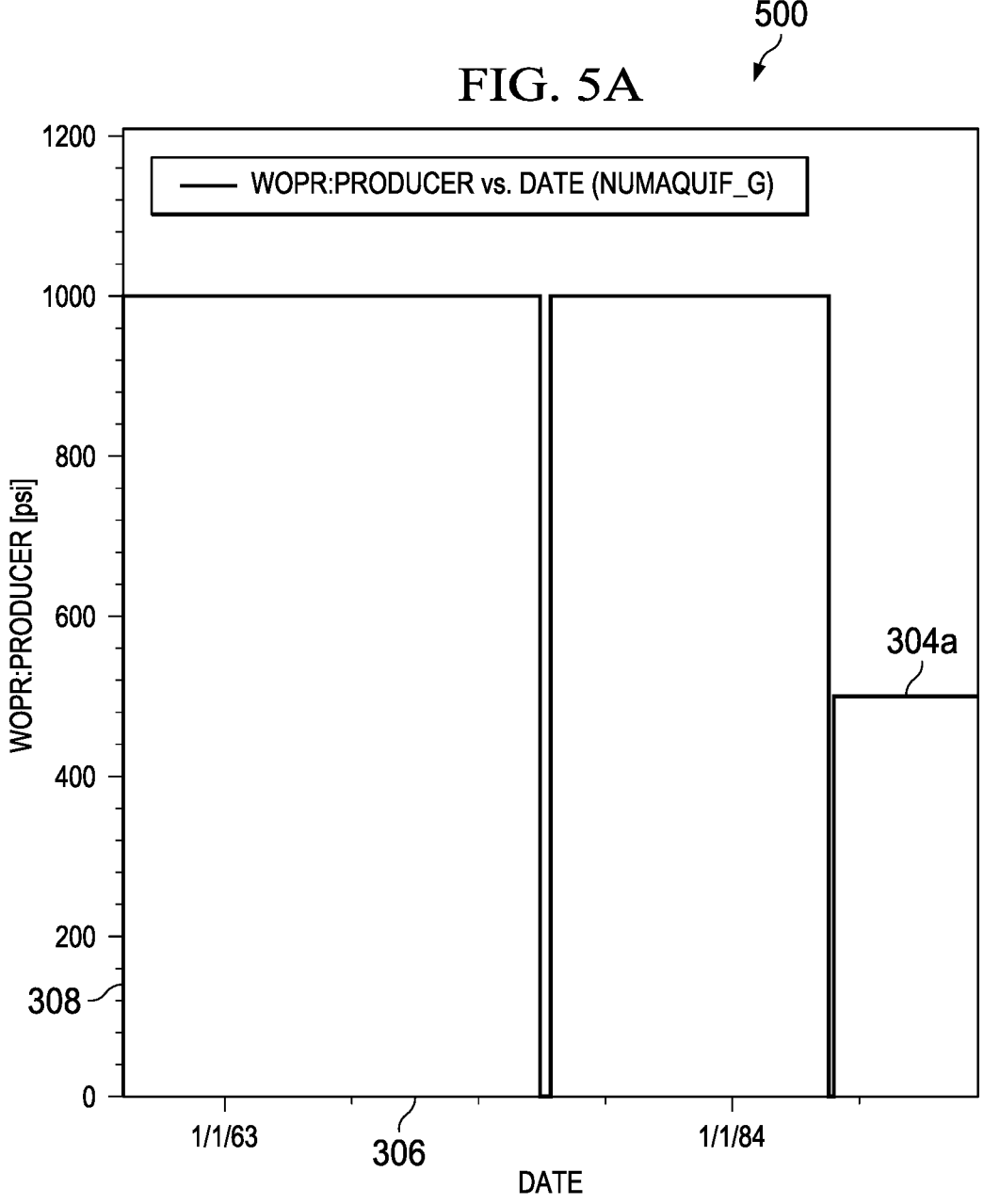
FIGS. 5A and 5B are plots collectively showing an example of matching of the geo-model realization pressure with properties different from truth case, according to some implementations of the present disclosure.
Figure 5B:
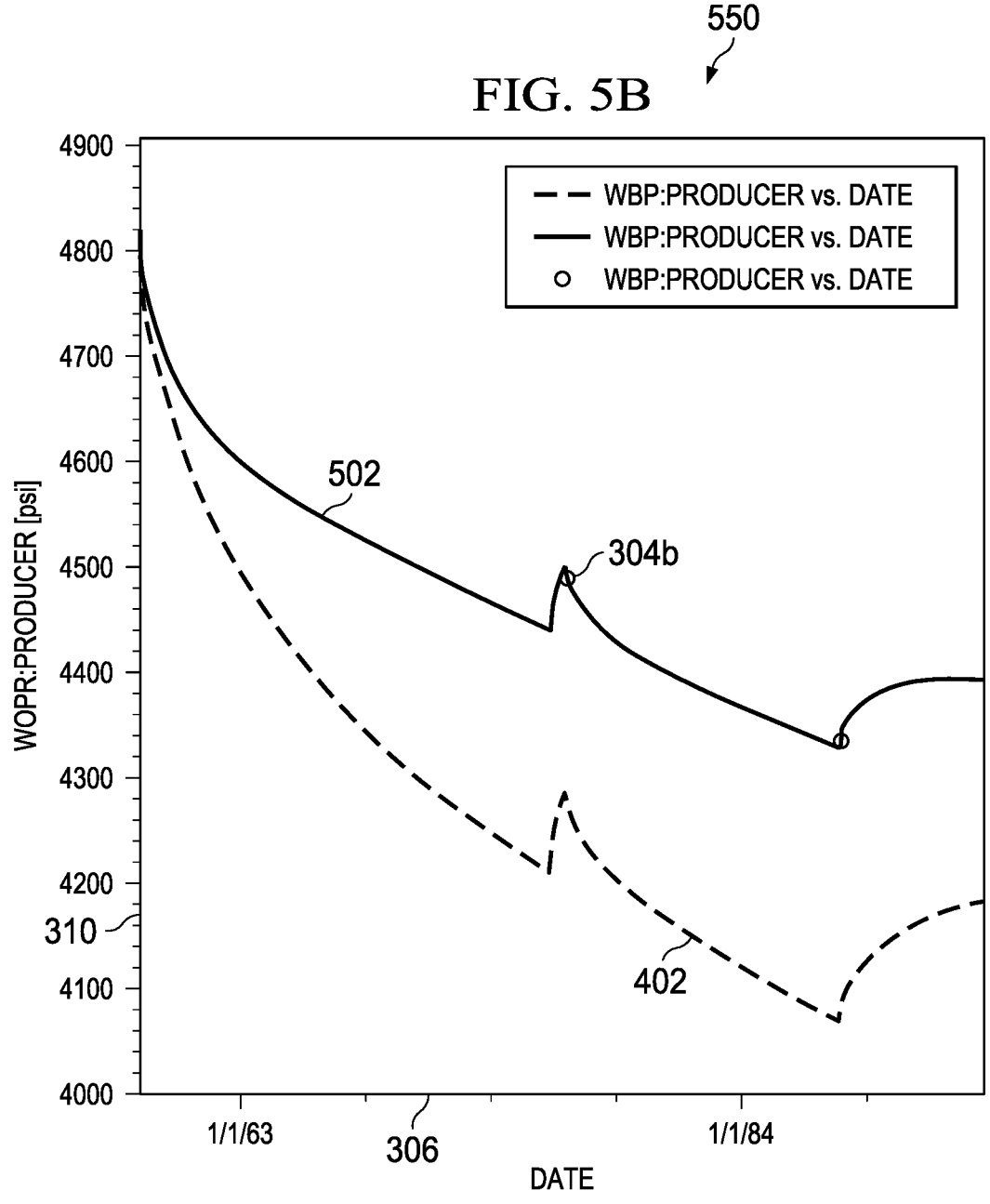

FIGS. 5A and 5B are plots collectively showing an example of matching of the geo-model realization pressure with properties different from truth case, according to some implementations of the present disclosure. A plot 502 is produced using an observed static pressure as the criteria for history-matching, allowing the achievement of both a production rate and an observed static pressure matching using properties that are different from the properties of the original hypothetical model shown in FIG. 3.

Figure 6:
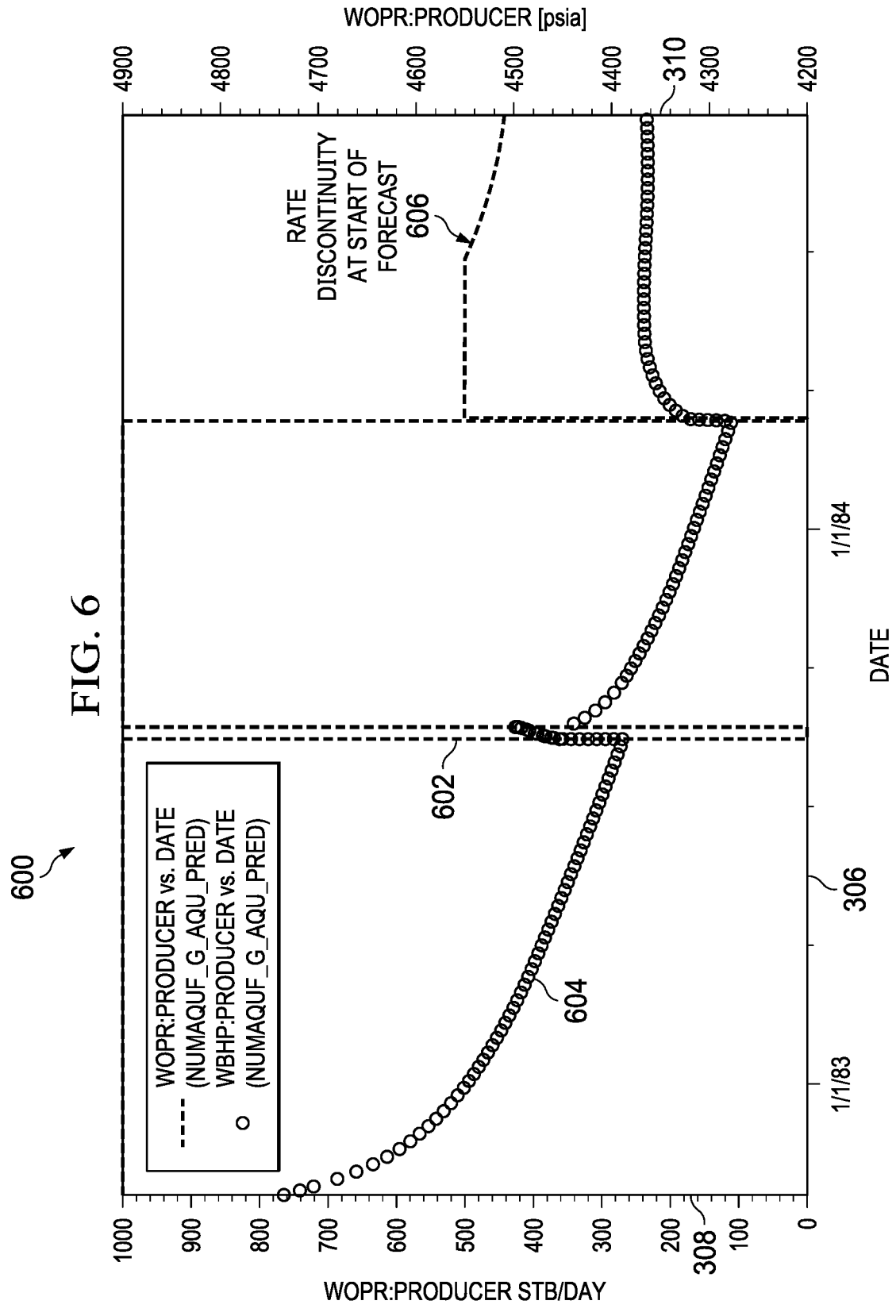
FIG. 6 is an illustration showing a prediction result of static pressure matched geo-model, according to some implementations of the present disclosure.

FIG. 6 is an illustration showing a prediction result of static pressure matched geo-model, according to some implementations of the present disclosure. The history-match scenario having wrong characterization (lesser permeability than truth) is shown in FIG. 6, now extended in a forecast mode using a BHP 310=4365 psia. FIG. 6 shows a historical flow-rate 602 from the truth case, a historical bottom-hole flowing pressure 604 from the truth case, and a rate forecast 606 of pessimistic model at start of forecast. Note that the BHP 310 at end-of-history in the hypothetical truth case is 4365 psia. As shown in the prediction results of FIG. 6, the pressure history-matched well could not sustain 500 barrels per day (bbl/d) production during prediction. Again, as stated earlier, this is an indication of a history match that has been obtained based on a different characterization than the original hypothetical model. History-matching can be an essential but tedious process in reservoir simulation. This process can be complex and time-consuming, and can result in many degrees of freedom. Usually, after a period of laborious history match exercise, it is sometimes not practical to re-visit the history match assumptions, it is customary to use a PI multiplier to alleviate the potential uncertainties related to well mismatches. Well-level matching can be particularly lengthy for large oil fields with hundreds or thousands of completions. Short-term forecast confidence can be improved by compensating well-level mismatches observed at the end of history-matching with PI multipliers without solving the inherent model problems.

Figure 7:
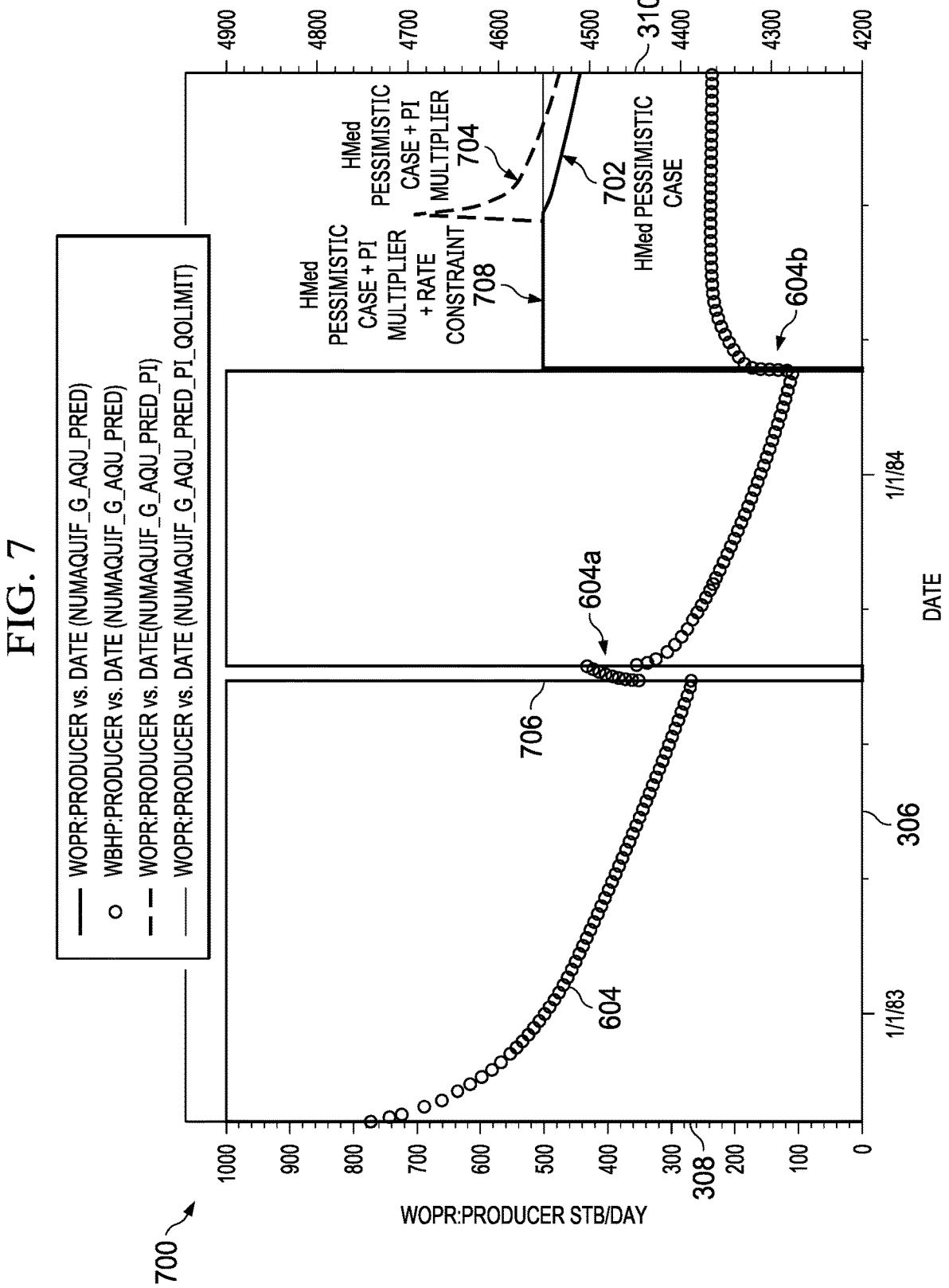
FIG. 7 is an illustration showing an example of a history match forecast discontinuity and productivity index (PI) calibration, according to some implementations of the present disclosure.

If a PI multiplier of 2 is applied to the well, a sudden spike can be observed in the oil rate, which rapidly declines as shown by line 704 in FIG. 7. An additional step that practitioners can use in order to prevent the spike caused by using PI multiplier is to constrain the well at the required production rate, in this case maximum oil rate=500. The well then produces the required rate as shown by line 708 in FIG. 7.

FIG. 7 is an illustration showing an example of a history match forecast discontinuity and PI calibration 700, according to some implementations of the present disclosure. FIG. 7 shows a forecast flow rate 702 of pessimistic history-matched model before PI multiplier, forecast flow rate 704 of pessimistic history-matched model after PI multiplier, and a historical flow rate 706 from truth case model. In the disclosed methodology, history-matching is based on FPBU rather than single-point static pressure as shown in FIGS. 2A and 2B and described in detail using two scenarios.

Scenario 1

Figures 8A, 8B:
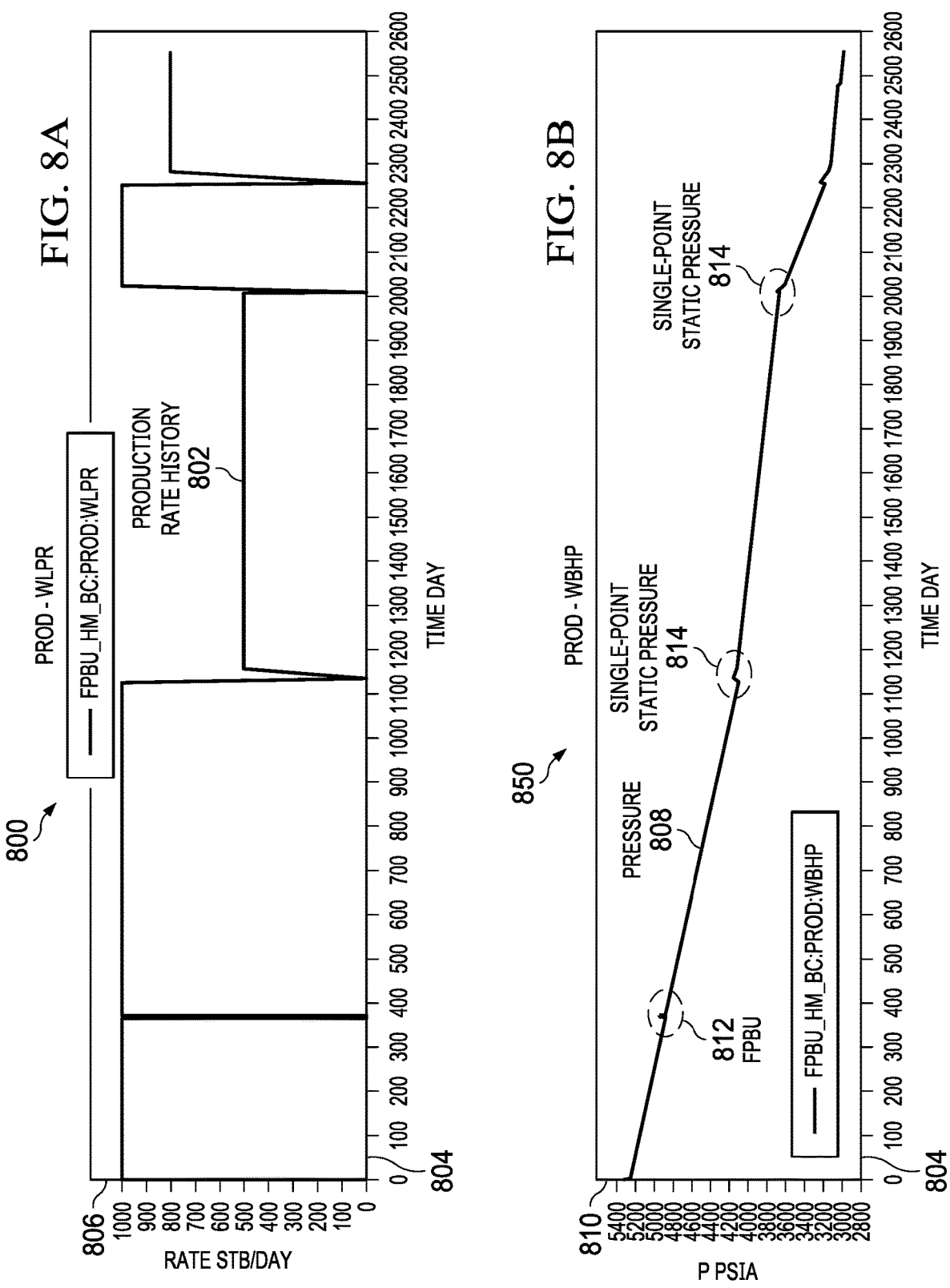
FIGS. 8A and 8B collectively illustrate an example of a hypothetical truth case production rate and pressure history, according to some implementations of the present disclosure.

FIGS. 8A and 8B collectively illustrate an example of a hypothetical truth case production rate 800 and pressure history 850, according to some implementations of the present disclosure. To achieve this, a synthetic model having uniform permeability of 200 md, bottom aquifer drive and other properties was created and subjected to the flow-rate constraint shown in FIG. 8A. A production rate history 802 is plotted relative to time 804 (for example, in days) and a production rate 806 (for example, in standard barrels per day (std/bpd)). In the pressure history 850 of FIG. 8B, a corresponding pressure transient 808 is plotted relative to time 804 and a pressure (P) 810 (for example, in psia). The model represented in FIGS. 8A and 8B is taken as a hypothetical truth model, and hence the simulated pressure is taken as field-observed (measured) data. FIG. 8B includes an FPBU 812 and single-point static pressures 814. An FPBU survey was conducted as shown, and the relevant plots for this FPBU are shown in FIGS. 9A and 9B.

Figure 9A:
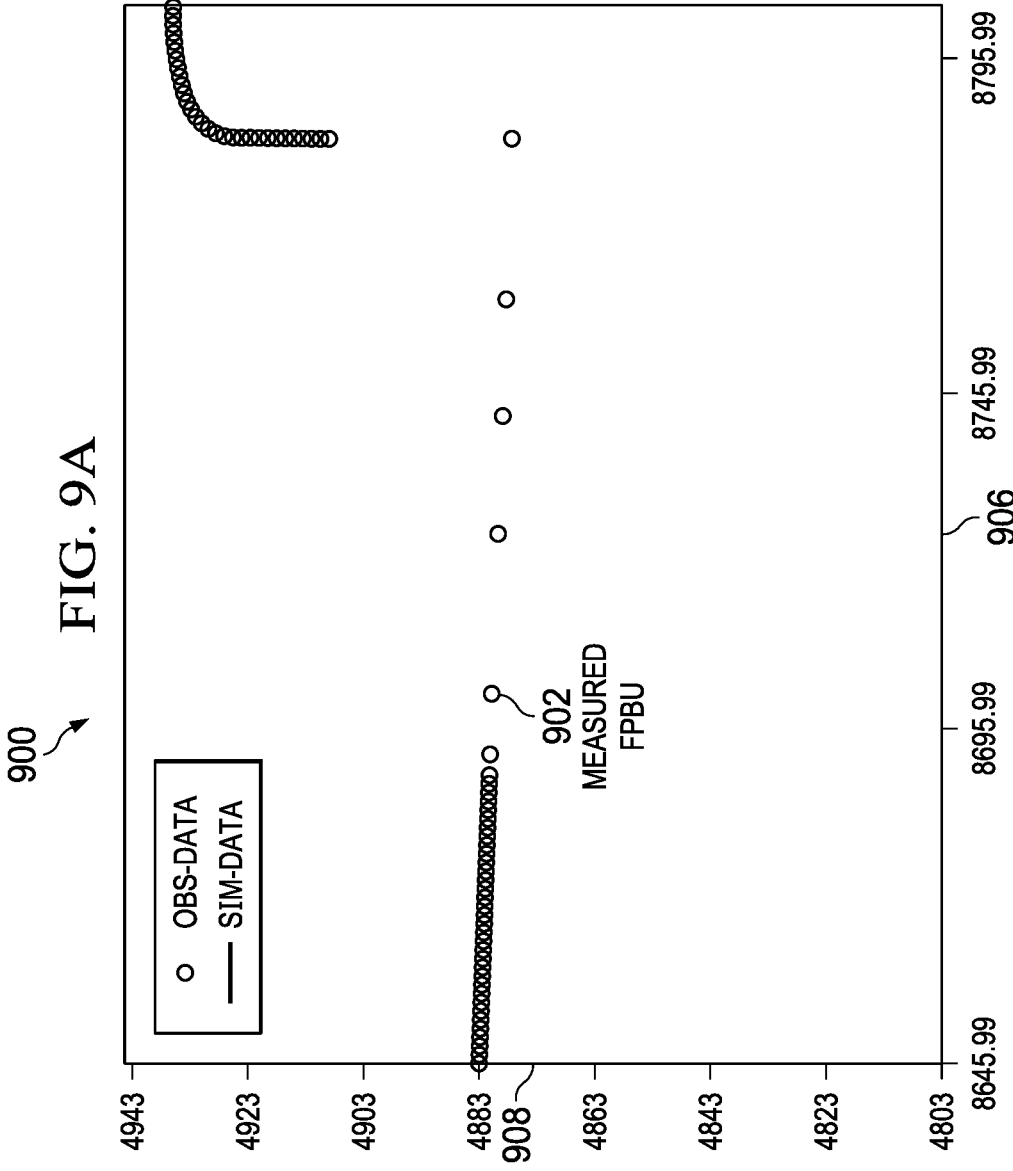
FIGS. 9A and 9B are plots collectively showing an example of a dataset to be matched based on a methodology for FPBU conducted on truth model, according to some implementations of the present disclosure.
Figure 9B:
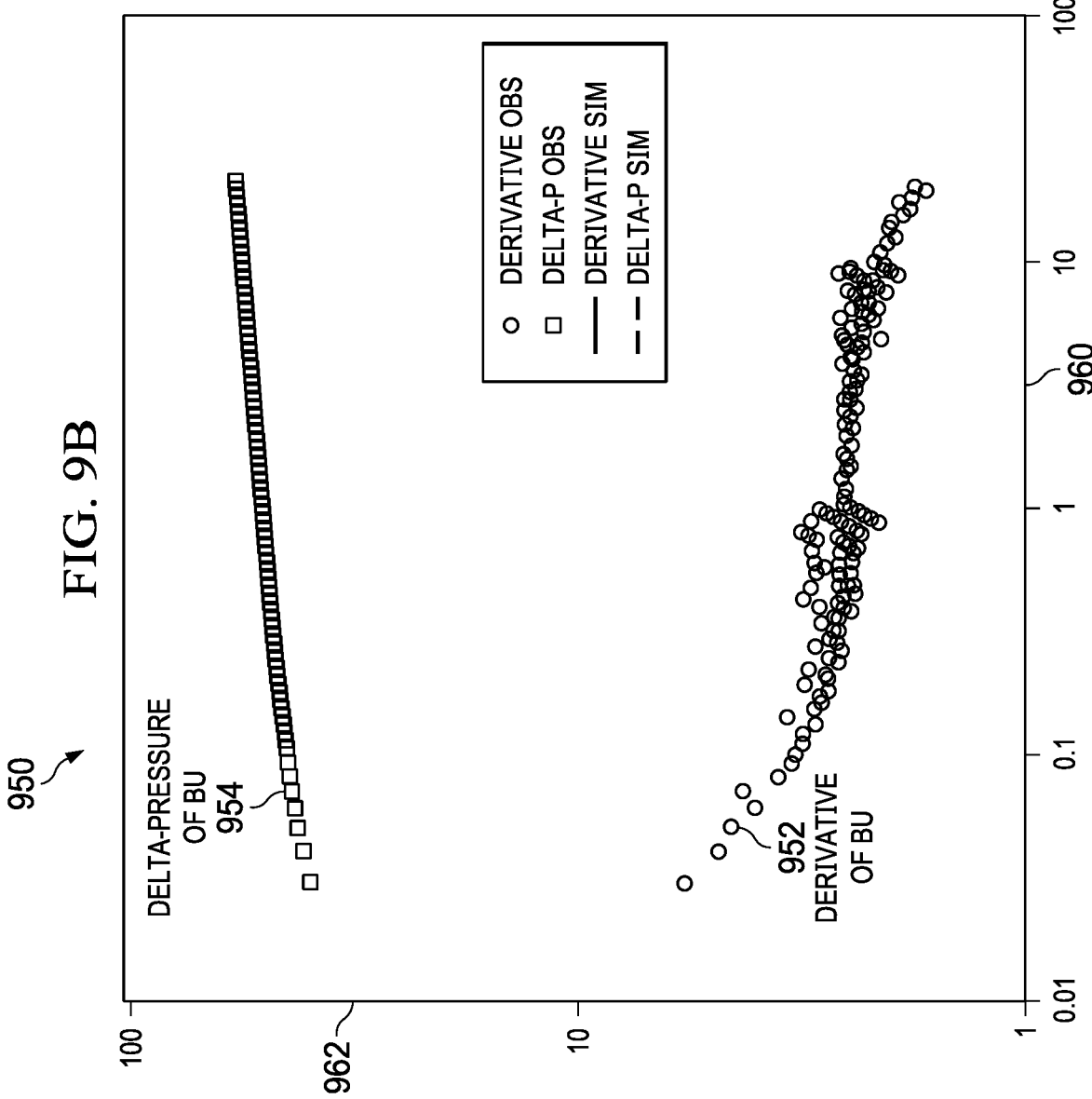

FIGS. 9A and 9B are plots 900 and 950 collectively showing an example of a dataset to be matched based on a methodology for FPBU conducted on truth model, according to some implementations of the present disclosure. Graph 900 shows a measured FPBU (observed data 902) and is plotted relative to time 906 and a pressure 908. During the geo-modeling of this "truth reservoir," the permeability model was underestimated, resulting in a model having a permeability of 70 md. In FIG. 9B, graph 950 includes plots for an observed derivative 952, an observed delta-P (pressure) 954, a simulated derivative 956, and a simulated delta-P 958. Plots in FIG. 9B are plotted relative to a log-scale time 960 and a log-scale pressure 962.

Figure 10:
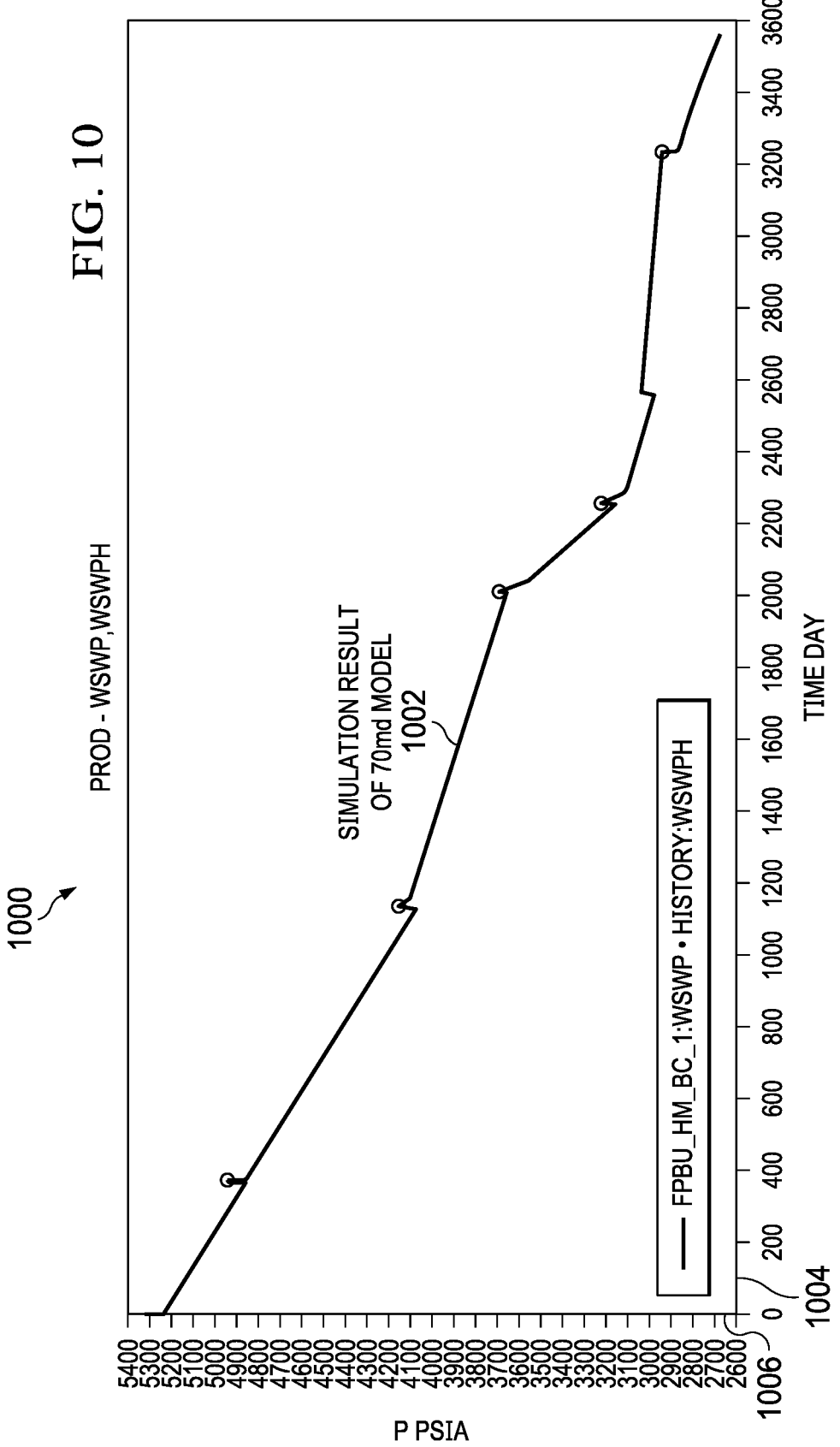
FIG. 10 is a graph showing an example of a simulated pressure from a geo-model compared to observed static pressure, according to some implementations of the present disclosure.

FIG. 10 is a graph 1000 showing an example of a simulated pressure 1002 from a 70 md geo-model compared to observed static pressure, according to some implementations of the present disclosure. FIG. 10 shows a match of simulated shut-in pressure and observed shut-in pressure (observed shut-in pressure is the shut-in pressures simulated on the hypothetical truth reservoir model). The simulated and observed shut-in pressures appear to match, even though the geo-model permeability is different from the truth model permeability (because of the non-uniqueness problem). However, by using the methodologies of the present disclosure, it is possible to avoid non-uniqueness as shown in the FIGS. 11A and 11B.

Figure 11A:
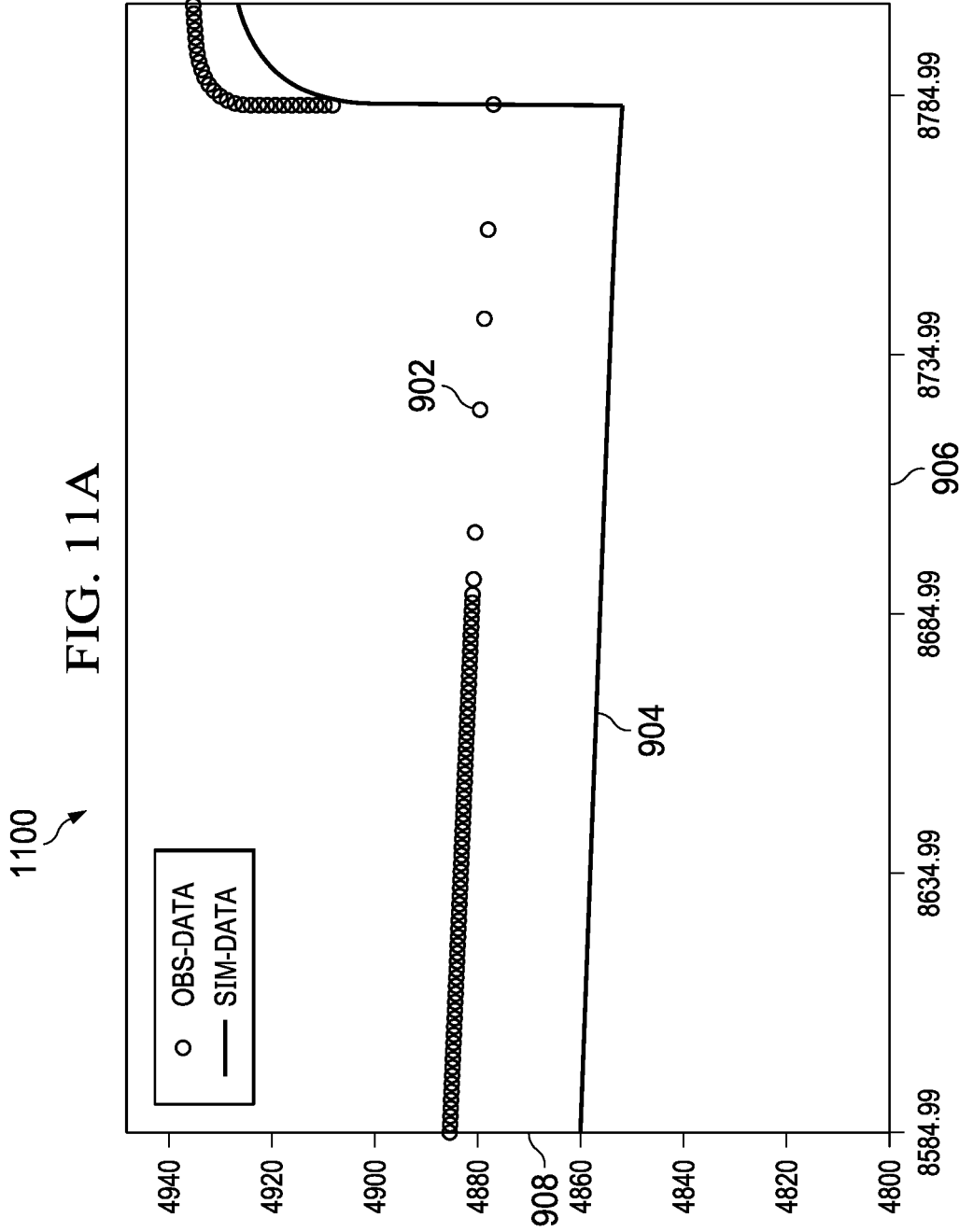
FIGS. 11A and 11B are plots collectively showing an example of a history-matching of observed FPBU using a geo-model, according to some implementations of the present disclosure.
Figure 11B:
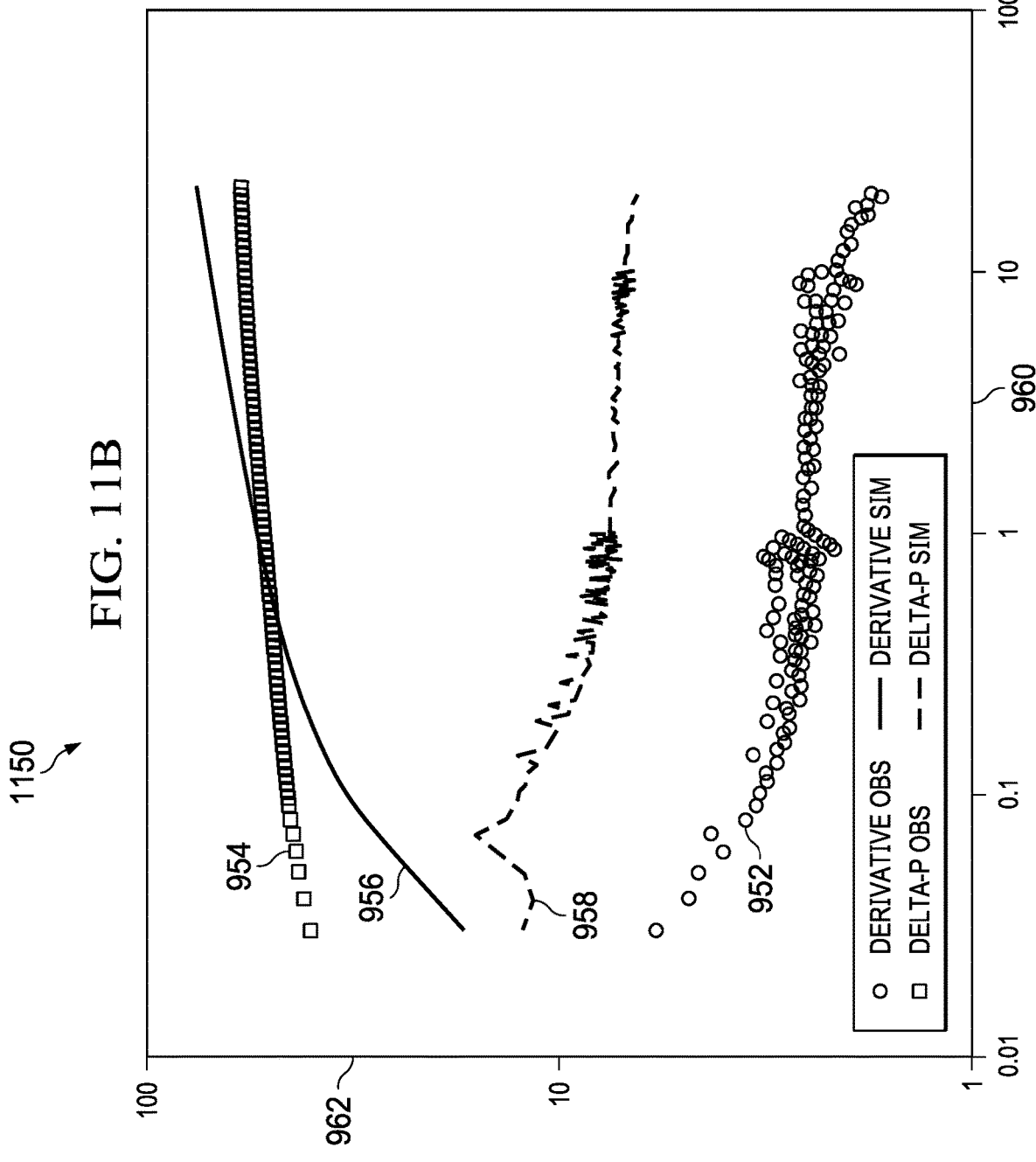

FIGS. 11A and 11B are plots collectively showing an example of a history-matching of observed FPBU using a 70 md geo-model, according to some implementations of the present disclosure. A model whose pressure match results appear to match when assessed from the prism of static pressure match may suddenly not match when viewed in the prism of the methodologies of the present disclosure. Fundamental issues that can be observed from the FPBU match shown in FIGS. 11A and 11B include the following. First, a simulated flowing pressure is too low compared to the truth case. At least 3 parameters can be tuned to correct this: a) increased aquifer support, b) increased well productivity index for example, introduce negative wellborn skin (implying simulation, for example, through fracking or acid simulation), and c) increased permeability. Second, the end-point of the simulated and observed FPBU pressure are not matched. For example, even the shape of the simulated build-up is not similar to the shape of the observed data build-up. Reservoir permeability and skin are the key influences of the shape of pressure build-up. Third, the BU-derivative of observed and simulated BU are not matching. Permeability is the controlling factor for the derivative stabilization. Fourth, the BU-delta-P is not matching. Formation skin damage (well PI) is the controlling factor for this parameter.

Techniques of the present disclosure used for history-matching can reduce the uncertainties involved in deterministic history-matching by providing diagnostic plots that help to constrain some of the degrees of freedom. Uncertainties can be reduced in the following ways. First, the incorporation of derivative plot can help to fix the value of permeability, because the derivative stabilization is exclusively a function of permeability. Second, the incorporation of the delta-pressure plot helps to fix the value of skin (well productivity index), because the separation between the derivative stabilization and the delta-pressure plot is exclusively a function of skin. Having fixed the values of formation skin damage and permeability, any remaining mismatch can be approached using other parameters such as aquifer strength and reservoir connectivity.

The use of a static pressure visualization in FIG. 10 can be interpreted as already having a history-matched model. The model of FIG. 10 can be used to predict the truth case using a BHP control of 4874 psi (for example, the BHP at beginning of prediction in the truth case is 4874 psi). FIG. 12 shows two key observations that the production forecast rate of the history-matched model is not the same as the production forecast rate of the truth model. For example, there is a discontinuity of production rates between history and the forecast in the history-matched case, but a smooth continuity in the truth case. This discontinuity is traditionally corrected by using PI calibration without really addressing its cause. Discontinuity refers to the initial forecast rate being different from the final historical rate when the final historical BHP is used as the forecast constraint.

FIG. 12 is an illustration showing an example of a prediction comparison 1200 between truth case 1202 and a history-matched case 1204 (for example, a geo-model with 70 md), according to some implementations of the present disclosure. Plots of the prediction comparison 120 are plotted relative to a date 1206 and a production rate 1208.

Based on the use of history-matching, FIGS. 11A and 11B identify a need to increase permeability (noting that a derivative stabilization value is inversely proportional to permeability). For example, by applying a permeability multiplier of 2.5 on the model, FIGS. 13A and 13B are obtained.

Figure 13A:
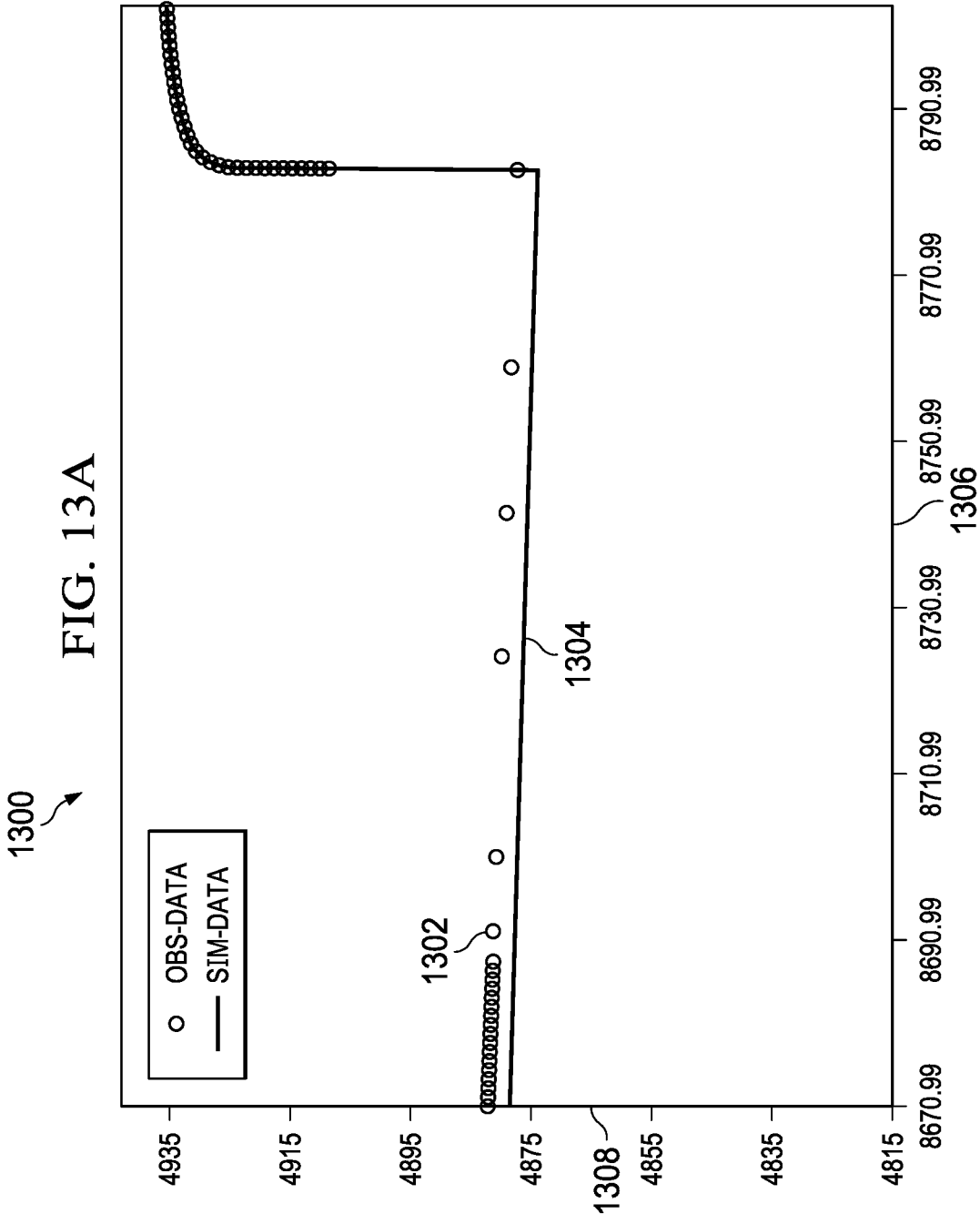
FIGS. 13A and 13B are plots collectively showing an example of an FPBU-driven history-matching of a geo-model having, according to some implementations of the present disclosure.
Figure 13B:
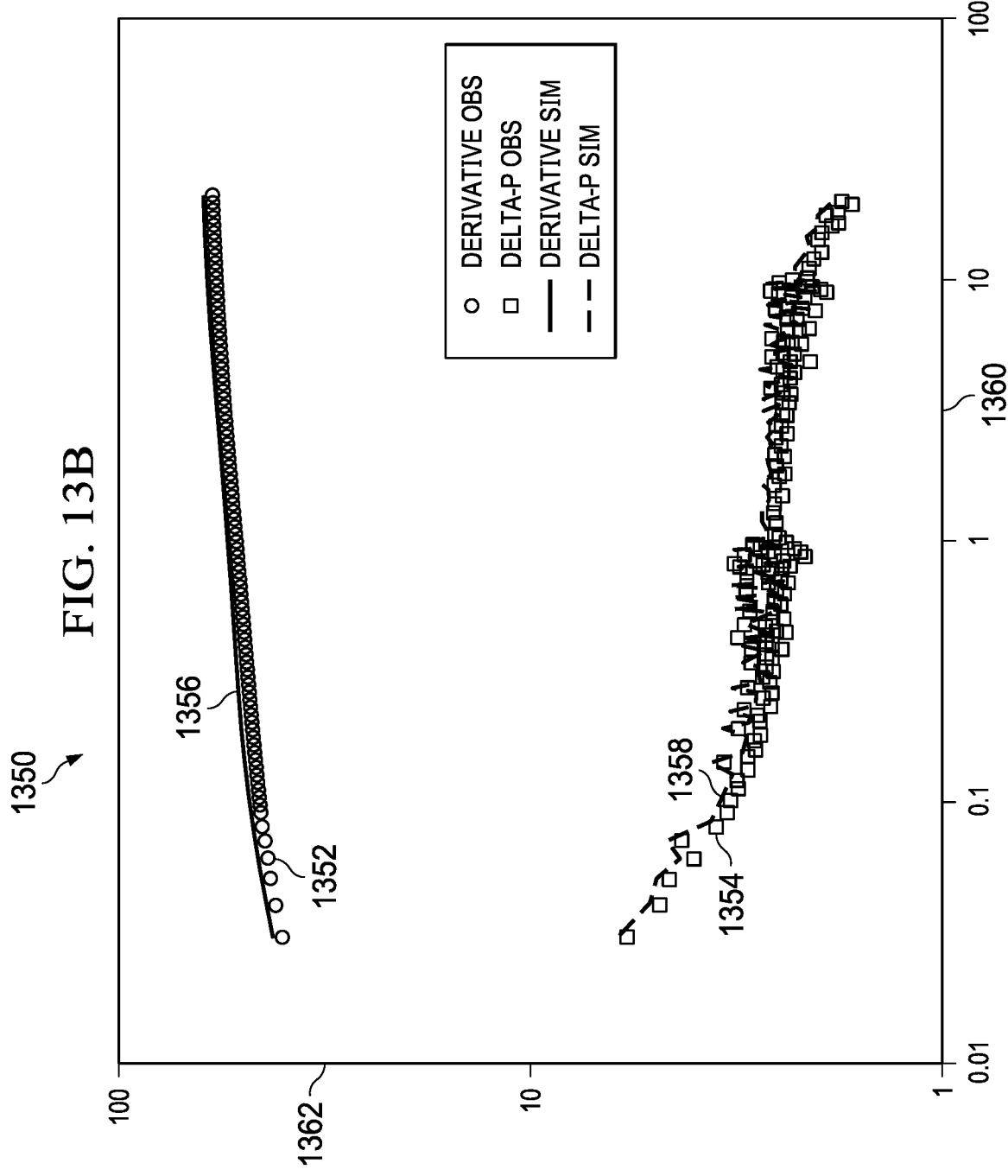

FIGS. 13A and 13B are plots collectively showing an example of an FPBU-driven history-matching of the geo-model having 70 md, according to some implementations of the present disclosure. Graph 1300 includes an observed data plot 1302, a simulation data plot 1304 that are plotted relative to time 106 and a pressure 1308. Graph 1350 includes an observed data derivative 1352, a delta-P observed plot 1354, a simulated data derivative 1356, a delta-P simulated plot 1358, plotted relative to a log-log graph including time 1360 and pressure 1362.

A permeability multiplier (for example, 2.5 in this case) can improve the permeability match, the well productivity match, the match of the flowing pressure, and the match of the shape of build-up. The techniques of the present disclosure can be used to conduct history-matching with features that help to minimize the solution non-uniqueness. An example forecast result of this FPBU driven history-matched model is shown in FIG. 14.

Figure 14:
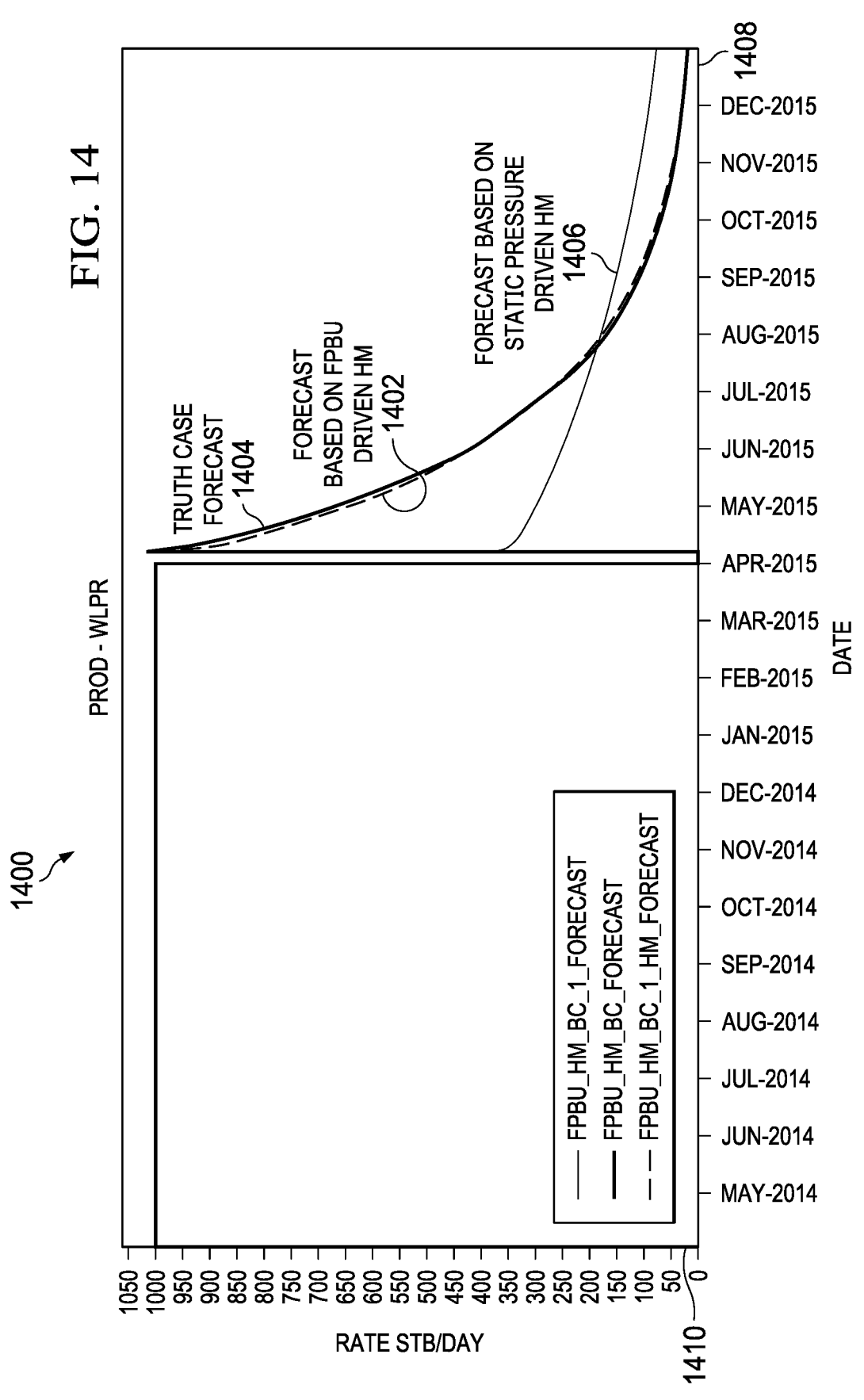
FIG. 14 is an illustration showing an example of a forecast comparison, according to some implementations of the present disclosure.

FIG. 14 is an illustration showing an example of a forecast comparison, according to some implementations of the present disclosure. Forecast 1402 based on FPBU history-matching, a truth case forecast 1404, an a forecast 1406 based on a static pressure driven history matching 1406, all plotted relative to time 1408 and a production rata 1410. The forecast production rate is consistent with the truth case, and the transition from the HM to forecast is near smooth. A limited discontinuity that is observed is because the flowing pressure is not perfectly matched. For example, as shown in FIGS. 13A and 13B, a slightly greater permeability multiplier of 2.8 can lead to matching all parameters and can ensure a better smoothness from HM to forecast without any need for PI calibration.

Scenario 2

Figure 15A:
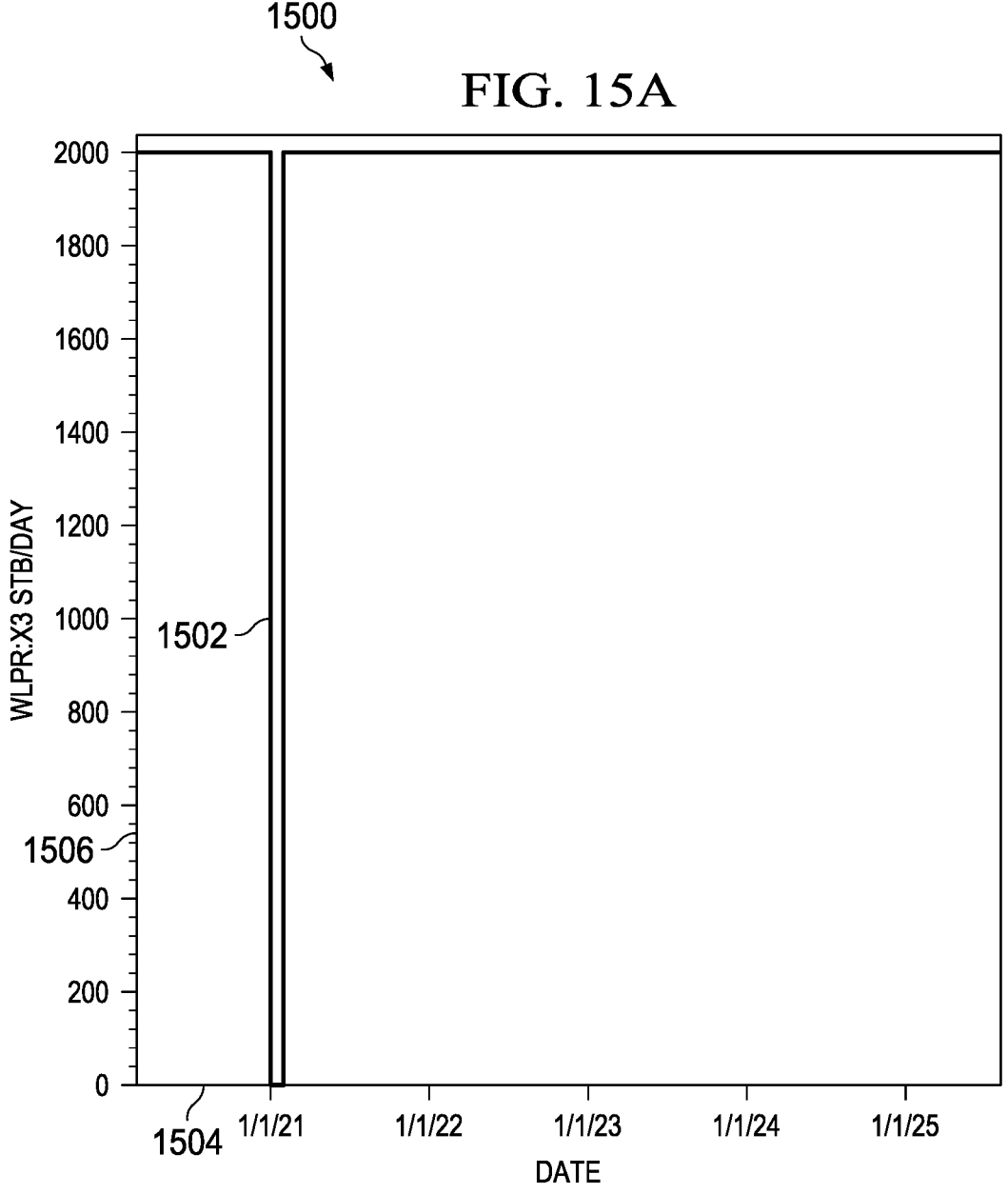
FIGS. 15A and 15B are plots collectively showing an example of flowrate and pressure history of hypothetical truth model, according to some implementations of the present disclosure.
Figure 15B:
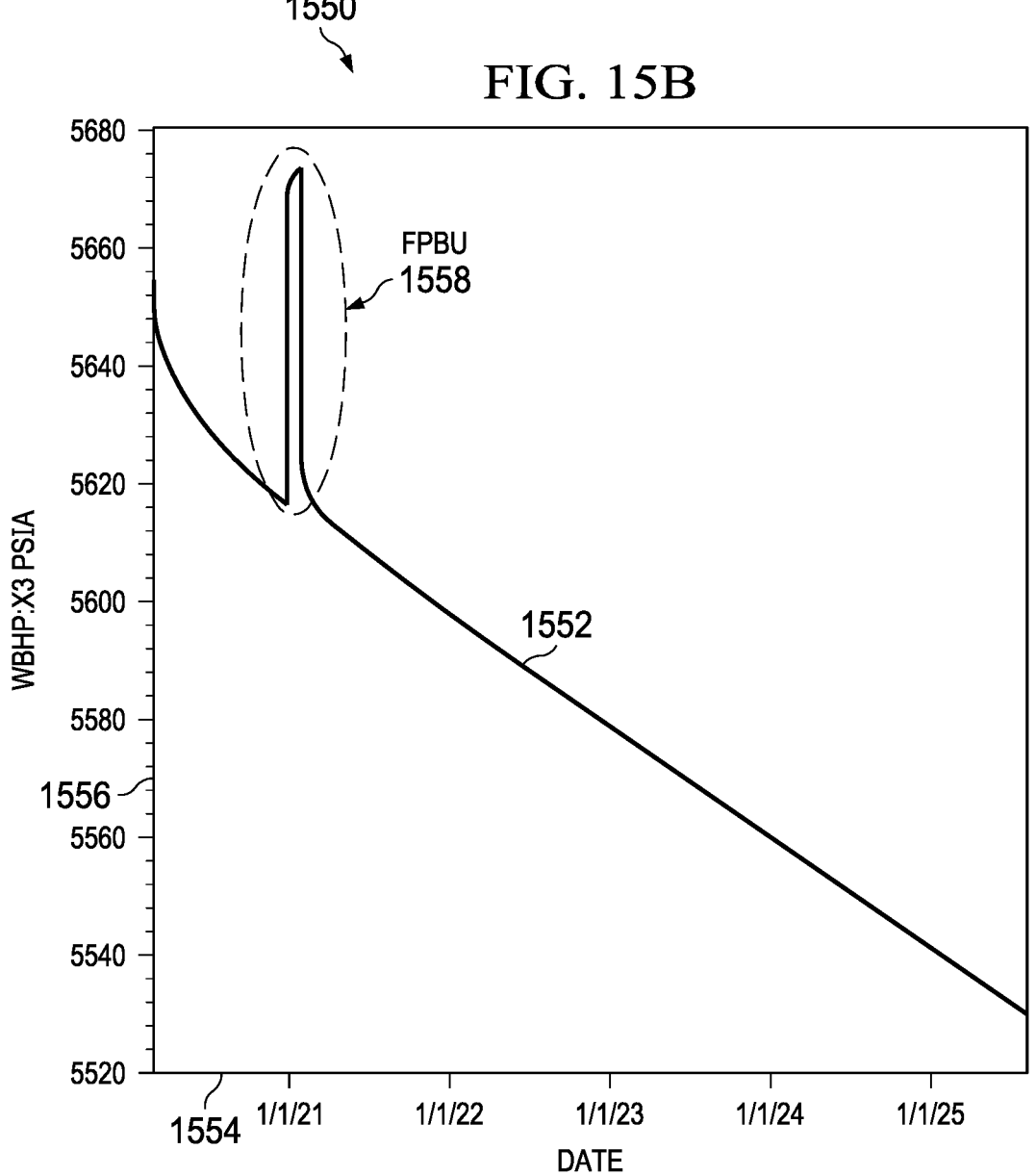

A synthetic model having uniform permeability of 200 md, edge aquifer drive and other properties was created. The flow-rate constraint and the corresponding pressure transient is shown in FIGS. 15A and 15B. The final shut-in pressure of the FPBU conducted in January-2021 is taken as the 'truth' observed pressure data FIGS. 15A and 15B are plots collectively showing an example of flowrate and pressure history of hypothetical truth model, according to some implementations of the present disclosure. A production rate plot 1502 is plotted relative to a date 1504 and a production rate 1506. A pressure plot 1552 is plotted relative to a data 1554 and a pressure 1556. A segment 1558 of the 1552 is attributable to FPBU 1558.

Figure 16:
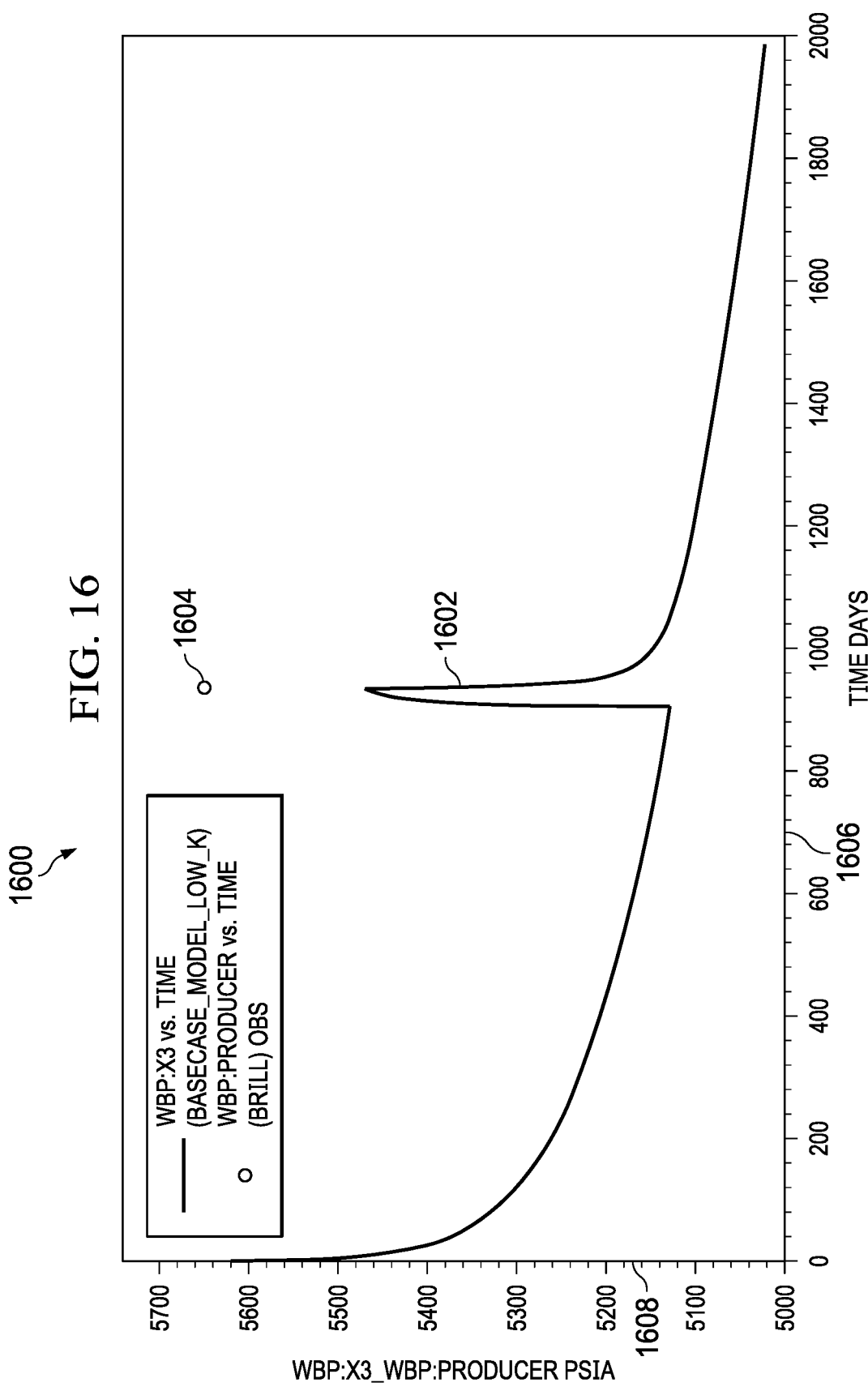
FIG. 16 is an illustration showing an example of a mismatch between a geo-model pressure and an observed static pressure, according to some implementations of the present disclosure.

During the geo-modeling of the synthetic reservoir, the resulting geo-model permeability was underestimated, resulting in a model having permeability of 10 md. FIG. 16 shows the history-match result of the geo-model, using the static pressure driven approach (observed static pressure is obtained from the truth model)

FIG. 16 is an illustration showing an example of a mismatch 1600 between 10 md geo-model pressure 1604 and an observed static pressure 1602, according to some implementations of the present disclosure. Plots 1602 and 1604 are plotted relative to time 1606 and a production rate 1608. In order to improve a history-match of the geo-model using a static pressure driven approach, multiple scenarios are possible. As an example, an excellent pressure match of FIG. 17 can be obtained using permeability multiplier of 4.5 and multiplier of aquifer volume of 1.3. This again is another example of the non-uniqueness problem, and it is possible to achieve a history-match of pressure using different properties than are in the original synthetic model.

Figure 17:
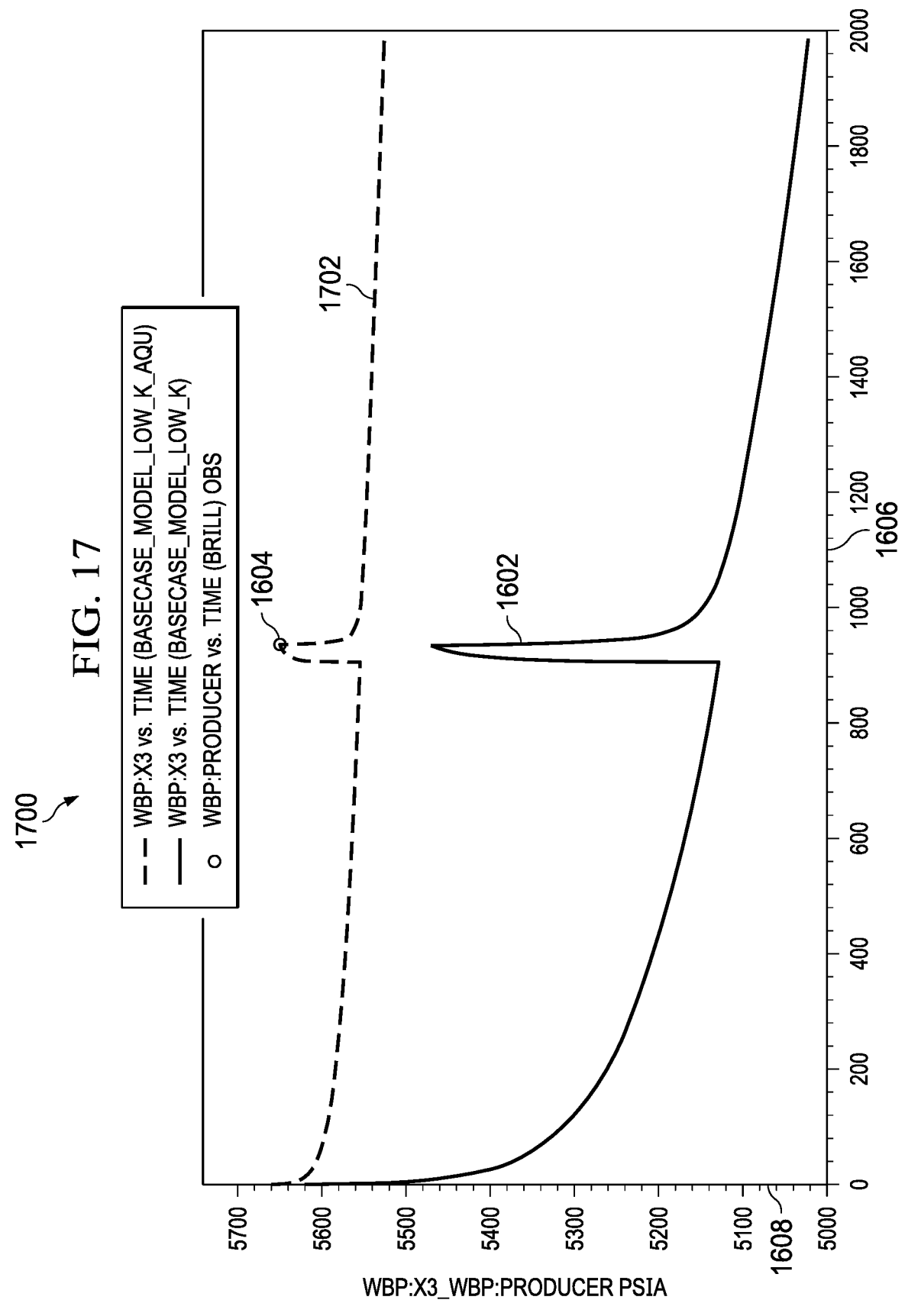
FIG. 17 is an illustration showing an example of a history-match of a model with properties different than the truth model, according to some implementations of the present disclosure.

FIG. 17 is an illustration showing an example of a history-match 1700 of a 10 md model 1702 with properties different than the truth model 1602, according to some implementations of the present disclosure. Some applications of a simulation model can include determining the potential production rates of wells under various operating conditions. Assume that operators want to invest in a surface facilities upgrade that would allow for the production at a lesser BHP than, for example, 5000 psi. By imposing a minimum BHP target of 5000 psi on the history-matched model and comparing the production profile to that of the truth case, it can be seen that the history-matched model has a different profile compared to the truth case.

FIG. 18 is an illustration showing an example of forecast profiles 1800 for an original synthetic model 1802 and the history-matched 10 md geo-model 1702, according to some implementations of the present disclosure. The history-matched case has a different forecast than the truth, considering that the history-match was achieved using permeability multiplier of 4.5 (corresponding to 4.5*10=45 md permeability), while the truth case is based on 200 md. The match had been obtained by using aquifer size to compensate for what is missing in permeability.

The FPBU history-matching approach can be used to assist the history-matching as follows. By matching the FPBU data rather than just the static-pressure data (the static-pressure data is the last measured pressure of the FPBU data), it becomes evident that the model is pessimistic in permeability as shown in FIGS. 19A and 19B.

Figure 19A:
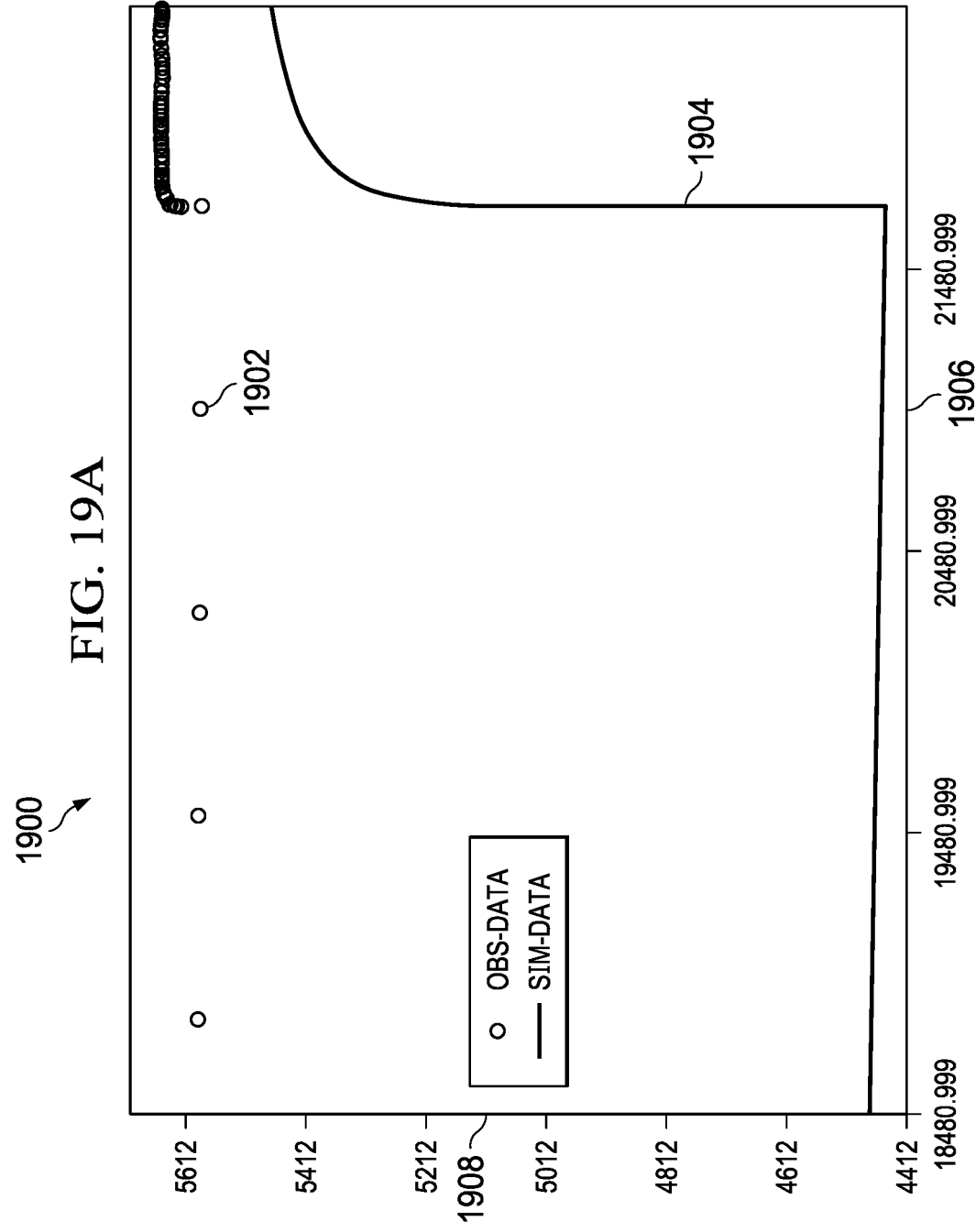
FIGS. 19A and 19B are plots collectively showing an example of an application of a proposed methodology to history-match the 10 md geo-model, according to some implementations of the present disclosure.
Figure 19B:
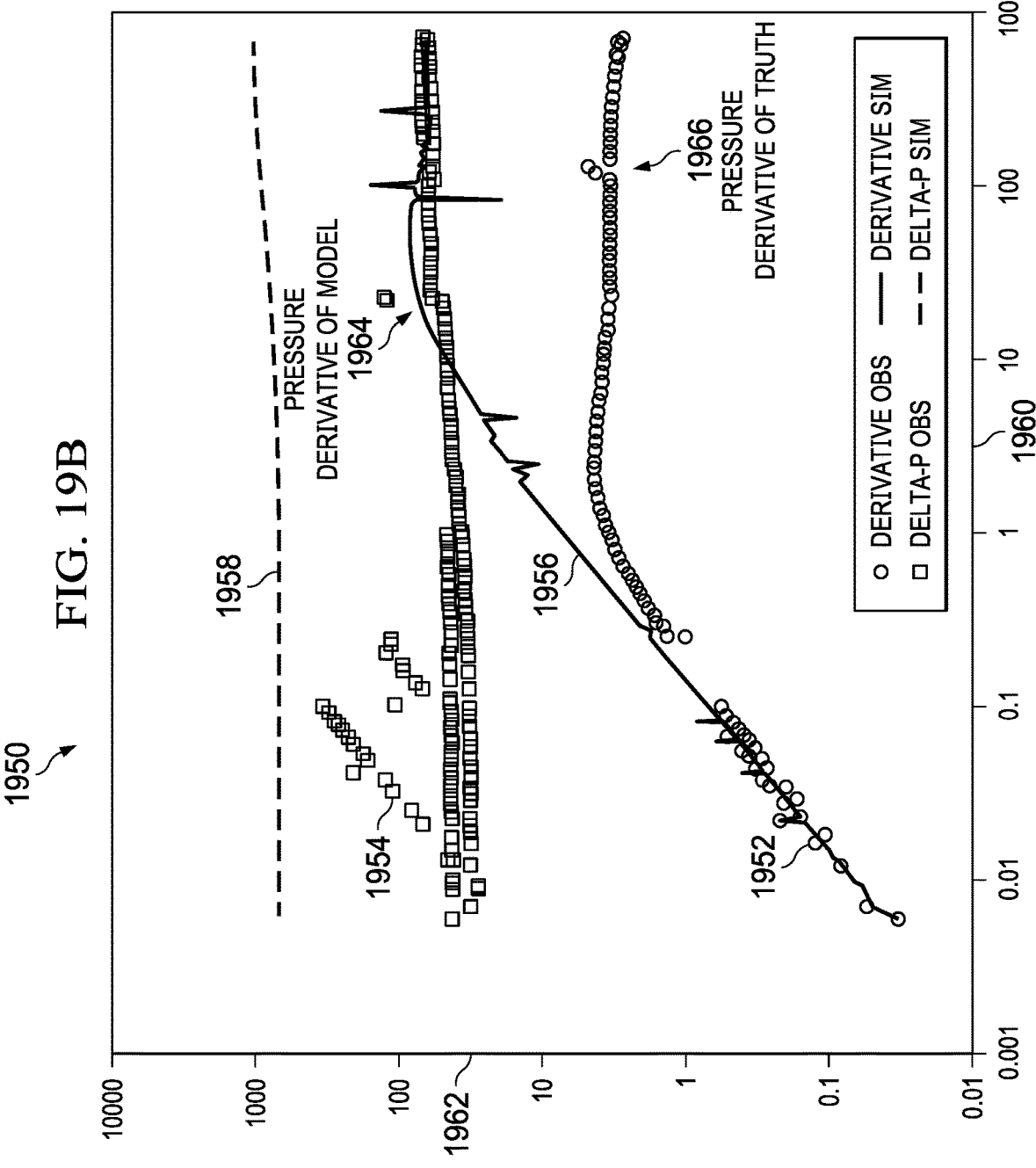

FIGS. 19A and 19B are plots 1900 and 1950 collectively showing an example of an application of a proposed methodology to history-match the 10 md geo-model, according to some implementations of the present disclosure. Plot 1900 includes an observed data plot 1902 and a simulated data plot 1904. Both plots 1902 and 1904 are plotted relative to time 1906 and a production rate 1908. Plot 1950 includes an observed derivative plot 1952, a delta-P observed plot 1954, a simulated derivative plot 1956, and a simulated delta-P plot 1958. The plots 1952, 1954, 1956, and 1959 are plotted relative to a log time 1960 and a log production rate 1962.

A first step of history-matching can be to ensure a match of pressure derivative of the model and the truth. In some implementations, the required permeability multiplier can be calculated using Equation (1):

$$multKx = \frac{\text{derivative stabilization of model}}{\text{derivative stabilization of truth}} \approx \frac{70}{4} \approx 18 \quad (1)$$

Figure 20A:
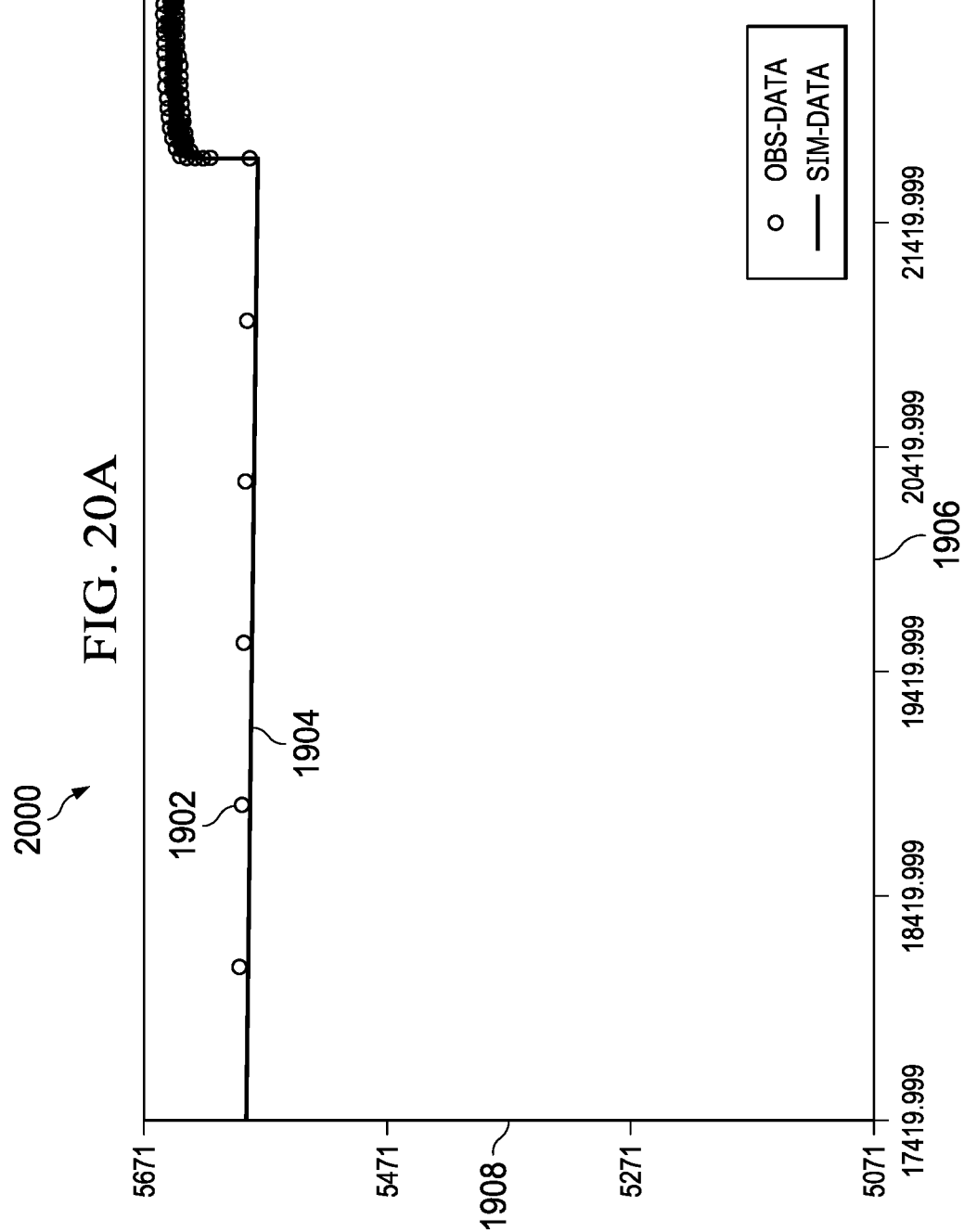
FIGS. 20A and 20B are plots collectively showing an example of an application of proposed methodology to ensure a history-match that is consistent with truth case properties, according to some implementations of the present disclosure.
Figure 20B:
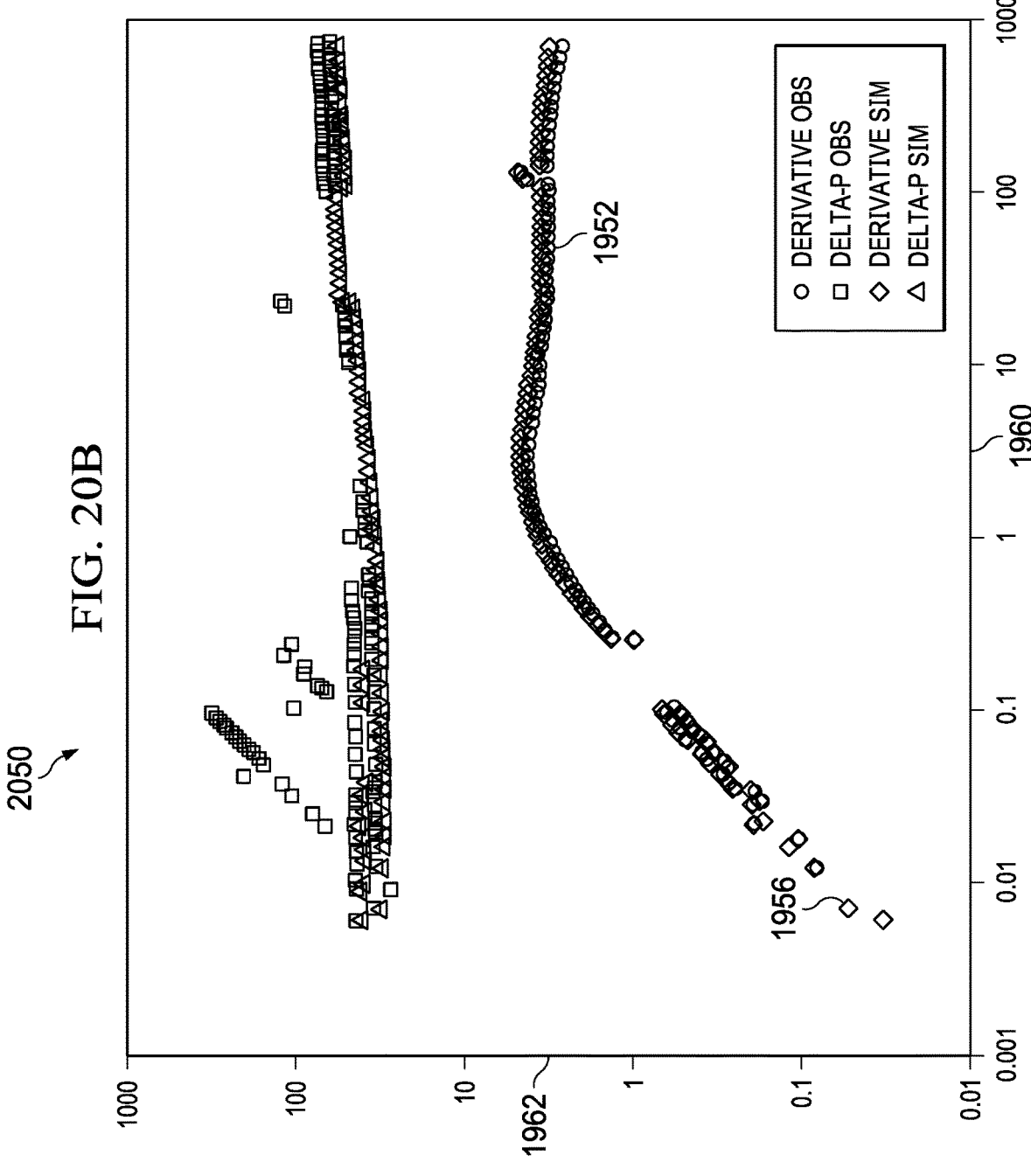

FIGS. 20A and 20B are plots 2000 and 2050 collectively showing an example of an application of proposed methodology to ensure a history-match that is consistent with truth case properties, according to some implementations of the present disclosure. Graph 2000 shows the observed data plot 1902 and the simulated data plot 1904. Graph 2050 shows an observed derivative plot 1952, an observed delta-P plot 1954, a simulated derivative plot 1956 and a simulated delta-P plot 1958. The plots 1952, 1954, 1956, and 1958 are plotted relative to a log date axis 1960 and a log pressure axis 1962.

As shown in FIGS. 20A and 20B, after a permeability multiply of 18 (corresponding to 18*10=180 md permeability), the permeability is almost perfectly matching as well as the flowing pressure. There is no further need to change aquifer parameters.

FIG. 21 is an illustration showing an example of forecast profiles for truth case forecast plot 2106 and history-matched case plot 2102 and 2104 driven by static pressure and FPBU, according to some implementations of the present disclosure. Graph 2100 includes FPBU-driven history-matching forecast plot 2102, static pressure-driven history-matching forecast plot 2104, and the truth case forecast plot 2106. The plots 2102, 2104, and 2106 are plotted relative to time 2108 (for example, in days) and production rate 2110 (for example, in stb/day).

FIG. 22 is an illustration showing an example of an impact of a well PI calibration, according to some implementations of the present disclosure. If a production forecast is made using a BHP minimum of 5000 psia, for example as shown in FIG. 21, then the history-match based on FPBU provides very similar results to the original synthetic model. Graph 2200 includes PI-calibrated history-matched case forecast plot 2202.

FIG. 23 is a flowchart of an example of a method 2300 for predicting values of static pressure, water cut, and GOR using simulated FPBU data, according to some implementations of the present disclosure. For clarity of presentation, the description that follows generally describes method 2300 in the context of the other figures in this description. However, it will be understood that method 2300 can be performed, for example, by any suitable system, environment, software, and hardware, or a combination of systems, environments, software, and hardware, as appropriate. In some implementations, various steps of method 2300 can be run in parallel, in combination, in loops, or in any order.

Method 2300 uses a forward approach to history matching, where reservoir properties of a reservoir are determined explicitly, independent of field performance data. For example, reservoir properties are forward-determined by history-matching FPBU data. Once reservoir properties have been determined, reservoir responses (field performance data) are then predicted. Any error in prediction of a reservoir response can be interpreted as uncertainty or an error in data measurement, providing a quality check of the measured data.

At 2302, a numerical simulation model is generated based on observed production rates and FPBU test rates. For example, models that create outputs 904 or 1904 can be generated. From 2302, method 2300 proceeds to 2304.

At 2304, a simulated diagnostic plot is generated using simulated FPBU data extracted from the numerical simulation model. For example, the simulation outputs 904 or 1904 can be generated based on FPBU history-matching, and used to create diagnostic plots 958 or 1956. From 2304, method 2300 proceeds to 2306.

At 2306, simulation model properties of the numerical simulation model are adjusted until the simulated diagnostic plot matches within a tolerance to an observed FPBU diagnostic plot. Example adjustments are from plot 1956 of FIG. 19B to plot 1956 of FIG. 20B, for example. From 2306, method 2300 proceeds to 2308.

At 2308, predicted values including a static pressure, a water cut, and a GOR are predicted using the simulated FPBU data. From 2308, method 2300 proceeds to 2310.

At 2310, observed data of a reservoir is reviewed and quality-checked based on comparing the predicted values within a tolerance of the observed data. After 2310, method 2300 can stop.

Figure 24:
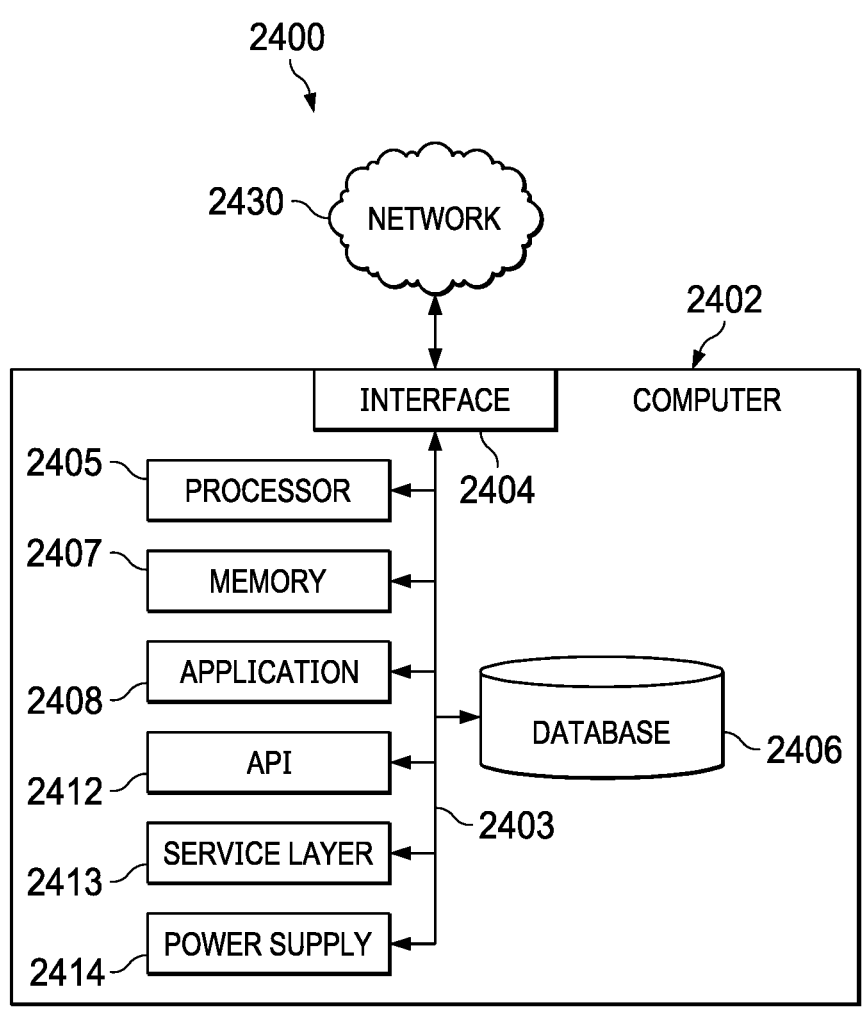
FIG. 24 is a block diagram illustrating an example computer system used to provide computational functionalities associated with described algorithms, methods, functions, processes, flows, and procedures as described in the present disclosure, according to some implementations of the present disclosure.

FIG. 24 is a block diagram of an example computer system 2400 used to provide computational functionalities associated with described algorithms, methods, functions, processes, flows, and procedures described in the present disclosure, according to some implementations of the present disclosure. The illustrated computer 2402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 2402 can include input devices such as keypads, keyboards, and touch screens that can accept user information. Also, the computer 2402 can include output devices that can convey information associated with the operation of the computer 2402. The information can include digital data, visual data, audio information, or a combination of information. The information can be presented in a graphical user interface (UI) (or GUI).

The computer 2402 can serve in a role as a client, a network component, a server, a database, a persistency, or components of a computer system for performing the subject matter described in the present disclosure. The illustrated computer 2402 is communicably coupled with a network 2430. In some implementations, one or more components of the computer 2402 can be configured to operate within different environments, including cloud-computing-based environments, local environments, global environments, and combinations of environments.

At a top level, the computer 2402 is an electronic computing device operable to receive, transmit, process, store, and manage data and information associated with the described subject matter. According to some implementations, the computer 2402 can also include, or be communicably coupled with, an application server, an email server, a web server, a caching server, a streaming data server, or a combination of servers.

The computer 2402 can receive requests over network 2430 from a client application (for example, executing on another computer 2402). The computer 2402 can respond to the received requests by processing the received requests using software applications. Requests can also be sent to the computer 2402 from internal users (for example, from a command console), external (or third) parties, automated applications, entities, individuals, systems, and computers.

Each of the components of the computer 2402 can communicate using a system bus 2403. In some implementations, any or all of the components of the computer 2402, including hardware or software components, can interface with each other or the interface 2404 (or a combination of both) over the system bus 2403. Interfaces can use an application programming interface (API) 2412, a service layer 2413, or a combination of the API 2412 and service layer 2413. The API 2412 can include specifications for routines, data structures, and object classes. The API 2412 can be either computer-language independent or dependent. The API 2412 can refer to a complete interface, a single function, or a set of APIs.

The service layer 2413 can provide software services to the computer 2402 and other components (whether illustrated or not) that are communicably coupled to the computer 2402. The functionality of the computer 2402 can be accessible for all service consumers using this service layer. Software services, such as those provided by the service layer 2413, can provide reusable, defined functionalities through a defined interface. For example, the interface can be software written in JAVA, C++, or a language providing data in extensible markup language (XML) format. While illustrated as an integrated component of the computer 2402, in alternative implementations, the API 2412 or the service layer 2413 can be stand-alone components in relation to other components of the computer 2402 and other components communicably coupled to the computer 2402. Moreover, any or all parts of the API 2412 or the service layer 2413 can be implemented as child or sub-modules of another software module, enterprise application, or hardware module without departing from the scope of the present disclosure.

The computer 2402 includes an interface 2404. Although illustrated as a single interface 2404 in FIG. 24, two or more interfaces 2404 can be used according to particular needs, desires, or particular implementations of the computer 2402 and the described functionality. The interface 2404 can be used by the computer 2402 for communicating with other systems that are connected to the network 2430 (whether illustrated or not) in a distributed environment. Generally, the interface 2404 can include, or be implemented using, logic encoded in software or hardware (or a combination of software and hardware) operable to communicate with the network 2430. More specifically, the interface 2404 can include software supporting one or more communication protocols associated with communications. As such, the network 2430 or the interface's hardware can be operable to communicate physical signals within and outside of the illustrated computer 2402.

The computer 2402 includes a processor 2405. Although illustrated as a single processor 2405 in FIG. 24, two or more processors 2405 can be used according to particular needs, desires, or particular implementations of the computer 2402 and the described functionality. Generally, the processor 2405 can execute instructions and can manipulate data to perform the operations of the computer 2402, including operations using algorithms, methods, functions, processes, flows, and procedures as described in the present disclosure.

The computer 2402 also includes a database 2406 that can hold data for the computer 2402 and other components connected to the network 2430 (whether illustrated or not). For example, database 2406 can be an in-memory, conventional, or a database storing data consistent with the present disclosure. In some implementations, database 2406 can be a combination of two or more different database types (for example, hybrid in-memory and conventional databases) according to particular needs, desires, or particular implementations of the computer 2402 and the described functionality. Although illustrated as a single database 2406 in FIG. 24, two or more databases (of the same, different, or combination of types) can be used according to particular needs, desires, or particular implementations of the computer 2402 and the described functionality. While database 2406 is illustrated as an internal component of the computer 2402, in alternative implementations, database 2406 can be external to the computer 2402.

The computer 2402 also includes a memory 2407 that can hold data for the computer 2402 or a combination of components connected to the network 2430 (whether illustrated or not). Memory 2407 can store any data consistent with the present disclosure. In some implementations, memory 2407 can be a combination of two or more different types of memory (for example, a combination of semiconductor and magnetic storage) according to particular needs, desires, or particular implementations of the computer 2402 and the described functionality. Although illustrated as a single memory 2407 in FIG. 24, two or more memories 2407 (of the same, different, or combination of types) can be used according to particular needs, desires, or particular implementations of the computer 2402 and the described functionality. While memory 2407 is illustrated as an internal component of the computer 2402, in alternative implementations, memory 2407 can be external to the computer 2402.

The application 2408 can be an algorithmic software engine providing functionality according to particular needs, desires, or particular implementations of the computer 2402 and the described functionality. For example, application 2408 can serve as one or more components, modules, or applications. Further, although illustrated as a single application 2408, the application 2408 can be implemented as multiple applications 2408 on the computer 2402. In addition, although illustrated as internal to the computer 2402, in alternative implementations, the application 2408 can be external to the computer 2402.

The computer 2402 can also include a power supply 2414. The power supply 2414 can include a rechargeable or non-rechargeable battery that can be configured to be either user- or non-user-replaceable. In some implementations, the power supply 2414 can include power-conversion and management circuits, including recharging, standby, and power management functionalities. In some implementations, the power-supply 2414 can include a power plug to allow the computer 2402 to be plugged into a wall socket or a power source to, for example, power the computer 2402 or recharge a rechargeable battery.

There can be any number of computers 2402 associated with, or external to, a computer system containing computer 2402, with each computer 2402 communicating over network 2430. Further, the terms "client," "user," and other appropriate terminology can be used interchangeably, as appropriate, without departing from the scope of the present disclosure. Moreover, the present disclosure contemplates that many users can use one computer 2402 and one user can use multiple computers 2402.

Described implementations of the subject matter can include one or more features, alone or in combination.

For example, in a first implementation, a computer-implemented method includes the following. A numerical simulation model is generated based on observed production rates and FPBU test rates. A simulated diagnostic plot is generated using simulated FPBU data extracted from the numerical simulation model. Simulation model properties of the numerical simulation model are adjusted until the simulated diagnostic plot matches within a tolerance to an observed FPBU diagnostic plot. Predicted values including a static pressure, a water cut, and a GOR are predicted using the simulated FPBU data. Observed data of a reservoir is reviewed and quality-checked based on comparing the predicted values within a tolerance of the observed data.

The foregoing and other described implementations can each, optionally, include one or more of the following features:

A first feature, combinable with any of the following features, where the tolerance is defined as 5%.

A second feature, combinable with any of the previous or following features, where the diagnostic plot is a derivative plot for stabilizing a derivative of a function of permeability.

A third feature, combinable with any of the previous or following features, where the diagnostic plot is a delta-pressure plot for fixing the value of a well productivity index as a separation between a derivative stabilization and a function of skin.

A fourth feature, combinable with any of the previous or following features, where the diagnostic plot includes a plot for a history-matched pessimistic case plus a productivity index (PI) multiplier.

A fifth feature, combinable with any of the previous or following features, where the diagnostic plot includes a plot for a history-matched pessimistic case plus a PI multiplier and a rate constraint.

A sixth feature, combinable with any of the previous or following features, where the diagnostic plot includes a truth case forecast and a history-matched case forecast.

In a second implementation, a non-transitory, computer-readable medium stores one or more instructions executable by a computer system to perform operations including the following. A numerical simulation model is generated based on observed production rates and FPBU test rates. A simulated diagnostic plot is generated using simulated FPBU data extracted from the numerical simulation model. Simulation model properties of the numerical simulation model are adjusted until the simulated diagnostic plot matches within a tolerance to an observed FPBU diagnostic plot. Predicted values including a static pressure, a water cut, and a GOR are predicted using the simulated FPBU data. Observed data of a reservoir is reviewed and quality-checked based on comparing the predicted values within a tolerance of the observed data.

The foregoing and other described implementations can each, optionally, include one or more of the following features:

A first feature, combinable with any of the following features, where the tolerance is defined as 5%.

A second feature, combinable with any of the previous or following features, where the diagnostic plot is a derivative plot for stabilizing a derivative of a function of permeability.

A third feature, combinable with any of the previous or following features, where the diagnostic plot is a delta-pressure plot for fixing the value of a well productivity index as a separation between a derivative stabilization and a function of skin.

A fourth feature, combinable with any of the previous or following features, where the diagnostic plot includes a plot for a history-matched pessimistic case plus a productivity index (PI) multiplier.

A fifth feature, combinable with any of the previous or following features, where the diagnostic plot includes a plot for a history-matched pessimistic case plus a PI multiplier and a rate constraint.

A sixth feature, combinable with any of the previous or following features, where the diagnostic plot includes a truth case forecast and a history-matched case forecast.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. A numerical simulation model is generated based on observed production rates and FPBU test rates. A simulated diagnostic plot is generated using simulated FPBU data extracted from the numerical simulation model. Simulation model properties of the numerical simulation model are adjusted until the simulated diagnostic plot matches within a tolerance to an observed FPBU diagnostic plot. Predicted values including a static pressure, a water cut, and a GOR are predicted using the simulated FPBU data. Observed data of a reservoir is reviewed and quality-checked based on comparing the predicted values within a tolerance of the observed data.

The foregoing and other described implementations can each, optionally, include one or more of the following features:

A first feature, combinable with any of the following features, where the tolerance is defined as 5%.

A second feature, combinable with any of the previous or following features, where the diagnostic plot is a derivative plot for stabilizing a derivative of a function of permeability.

A third feature, combinable with any of the previous or following features, where the diagnostic plot is a delta-pressure plot for fixing the value of a well productivity index as a separation between a derivative stabilization and a function of skin.

A fourth feature, combinable with any of the previous or following features, where the diagnostic plot includes a plot for a history-matched pessimistic case plus a productivity index (PI) multiplier.

A fifth feature, combinable with any of the previous or following features, where the diagnostic plot includes a plot for a history-matched pessimistic case plus a PI multiplier and a rate constraint.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/nonpermanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
receiving, from a gauge lowered into a well and positioned by a perforation of the well, measured production rates and a pressure transient survey comprising a flowing pressure and build-up (FPBU) test rates, the FPBU test rates comprising a build-up pressure derivative;
generating a numerical simulation model based on cored data and logs, the numerical simulation model being constrained to the measured production rates and the pressure transient survey;
generating, using simulated FPBU data extracted from the numerical simulation model, a simulated diagnostic plot;
determining missing well events comprising missing production data within the measured production rates;
adjusting simulation model properties of the numerical simulation model until the simulated diagnostic plot matches within a tolerance to a measured FPBU diagnostic plot comprising the FPBU test rates to calibrate an aquifer strength, wherein the simulation model properties comprise an aquifer support, a wellbore skin, and a reservoir permeability and wherein the numerical simulation model captures relevant well events comprising depletion and injection;
calibrating inter-well grid-blocks of the numerical simulation model within each connected reservoir region minimizing a discontinuity at a history-forecast junction;
predicting, using the simulated FPBU data, predicted values comprising a static pressure, a water cut, and a gas-oil rate (GOR);
reviewing and quality-checking measured data of a reservoir based on a comparison of the predicted values within a tolerance of the measured production rates and the FPBU test rates; and
controlling one or more well operations based on the comparison.

2. The computer-implemented method of claim 1, wherein the tolerance is defined as 5%.

3. The computer-implemented method of claim 1, wherein the measured FPBU diagnostic plot is a function of permeability.

4. The computer-implemented method of claim 1, wherein the measured FPBU diagnostic plot is a delta-pressure plot for fixing a value of a well productivity index.

5. The computer-implemented method of claim 1, wherein the measured FPBU diagnostic plot comprises a plot for a history-matched pessimistic case plus a productivity index (PI) multiplier.

6. The computer-implemented method of claim 5, wherein the measured FPBU diagnostic plot comprises a plot for a history-matched pessimistic case plus a PI multiplier and a rate constraint.

7. The computer-implemented method of claim 1, wherein the measured FPBU diagnostic plot comprises a truth case forecast and a history-matched case forecast.

8. A non-transitory, computer-readable medium storing one or more instructions executable by a computer system to perform operations comprising:
receiving, from a gauge lowered into a well and positioned by a perforation of the well, measured production rates and a pressure transient survey comprising a flowing pressure and build-up (FPBU) test rates, the FPBU test rates comprising a build-up pressure derivative;
generating a numerical simulation model based on cored data and logs, the numerical simulation model being constrained to the measured production rates and the pressure transient survey;
generating, using simulated FPBU data extracted from the numerical simulation model, a simulated diagnostic plot;
determining missing well events comprising missing production data within the measured production rates;
adjusting simulation model properties of the numerical simulation model until the simulated diagnostic plot matches within a tolerance to a measured FPBU diagnostic plot comprising the FPBU test rates to calibrate an aquifer strength, wherein the simulation model properties comprise an aquifer support, a wellbore skin, and a reservoir permeability and wherein the numerical simulation model captures relevant well events comprising depletion and injection;
calibrating inter-well grid-blocks of the numerical simulation model within each connected reservoir region minimizing a discontinuity at a history-forecast junction;
predicting, using the simulated FPBU data, predicted values comprising a static pressure, a water cut, and a gas-oil rate (GOR);
reviewing and quality-checking measured data of a reservoir based on a comparison of the predicted values within a tolerance of the measured production rates and the FPBU test rates; and
controlling one or more well operations based on the comparison.

9. The non-transitory, computer-readable medium of claim 8, wherein the tolerance is defined as 5%.

10. The non-transitory, computer-readable medium of claim 8, wherein the measured FPBU diagnostic plot is a function of permeability.

11. The non-transitory, computer-readable medium of claim 8, wherein the measured FPBU diagnostic plot is a delta-pressure plot for fixing a value of a well productivity index.

12. The non-transitory, computer-readable medium of claim 8, wherein the measured FPBU diagnostic plot comprises a plot for a history-matched pessimistic case plus a productivity index (PI) multiplier.

13. The non-transitory, computer-readable medium of claim 12 wherein the measured FPBU diagnostic plot comprises a plot for a history-matched pessimistic case plus a PI multiplier and a rate constraint.

14. The non-transitory, computer-readable medium of claim 8, wherein the measured FPBU diagnostic plot comprises a truth case forecast and a history-matched case forecast.

15. A computer-implemented system, comprising:

one or more processors; and a non-transitory computer-readable storage medium coupled to the one or more processors and storing programming instructions for execution by the one or more processors, the programming instructions instructing the one or more processors to perform operations comprising:

receiving, from a gauge lowered into a well and positioned by a perforation of the well, measured production rates and a pressure transient survey comprising a flowing pressure and build-up (FPBU) test rates, the FPBU test rates comprising a build-up pressure derivative;

generating a numerical simulation model based on cored data and logs, the numerical simulation model being constrained to the measured production rates and the pressure transient survey;

generating, using simulated FPBU data extracted from the numerical simulation model, a simulated diagnostic plot;

determining missing well events comprising missing production data within the measured production rates;

adjusting simulation model properties of the numerical simulation model until the simulated diagnostic plot matches within a tolerance to a measured FPBU diagnostic plot comprising the FPBU test rates to calibrate an aquifer strength, wherein the simulation model properties comprise an aquifer support, a wellbore skin, and a reservoir permeability and wherein the numerical simulation model captures relevant well events comprising depletion and injection;

calibrating inter-well grid-blocks of the numerical simulation model within each connected reservoir region minimizing a discontinuity at a history-forecast junction;

predicting, using the simulated FPBU data, predicted values comprising a static pressure, a water cut, and a gas-oil rate (GOR);

reviewing and quality-checking measured data of a reservoir based on a comparison of the predicted values within a tolerance of the measured production rates and the FPBU test rates; and controlling one or more well operations based on the comparison.

16. The computer-implemented system of claim 15, wherein the tolerance is defined as 5%.

17. The computer-implemented system of claim 15, wherein the measured FPBU diagnostic plot is a function of permeability.

18. The computer-implemented system of claim 15, wherein the measured FPBU diagnostic plot is a delta-pressure plot for fixing a value of a well productivity index.

19. The computer-implemented system of claim 15, wherein the measured FPBU diagnostic plot comprises a plot for a history-matched pessimistic case plus a productivity index (PI) multiplier.

20. The computer-implemented system of claim 19, wherein the measured FPBU diagnostic plot comprises a plot for a history-matched pessimistic case plus a PI multiplier and a rate constraint.

\* \* \* \* \*